(12) United States Patent
Zhan et al.

(10) Patent No.: US 8,705,778 B2
(45) Date of Patent: Apr. 22, 2014

(54) METHOD AND APPARATUS FOR GENERATING AND PLAYING AUDIO SIGNALS, AND SYSTEM FOR PROCESSING AUDIO SIGNALS

(75) Inventors: Wuzhou Zhan, Shenzhen (CN); Dongqi Wang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 234 days.

(21) Appl. No.: 13/035,400

(22) Filed: Feb. 25, 2011

(65) Prior Publication Data

US 2011/0164769 A1    Jul. 7, 2011

Related U.S. Application Data

(63) Continuation of application No. PCT/CN2009/073406, filed on Aug. 21, 2009.

(30) Foreign Application Priority Data

Aug. 27, 2008   (CN) .......................... 2008 1 0119140

(51) Int. Cl.
*H04R 5/02* (2006.01)
(52) U.S. Cl.
USPC ............. 381/306; 381/307; 381/310; 381/92; 381/122; 348/116; 348/14.08
(58) Field of Classification Search
USPC .............. 381/1, 19, 20, 21, 22, 23, 306, 307, 381/310, 26, 92, 80, 81, 85, 119, 122, 123; 704/270; 700/94; 348/116, 198, 158, 348/14.01, 14.08, 14.09, 14.1, 14.13, 348/14.16; 359/444, 445, 446, 447; 379/93.21, 158
See application file for complete search history.

(56) References Cited

U.S. PATENT DOCUMENTS 5,714,997 A    2/1998  Anderson
5,778,082 A *  7/1998  Chu et al. .................... 381/92
(Continued)

FOREIGN PATENT DOCUMENTS

CN    1717955 A    1/2006
CN    1922655 A    2/2007
(Continued)

OTHER PUBLICATIONS

EPO Extended European Search Report mailed Aug. 10, 2012, issued in related European Patent Application No. 09809218.2, Huawei Device Co., Ltd. (9 pages).

(Continued)

*Primary Examiner* — Vivian Chin
*Assistant Examiner* — Leshui Zhang
(74) *Attorney, Agent, or Firm* — Huawei Technologies Co., Ltd.

(57) ABSTRACT

A method for generating and playing audio signals and a system for processing audio signals are disclosed. The method for generating audio signals includes: generating distance information about an audio signal corresponding to a view point position, according to obtained auxiliary video and direction information about the audio signal, where the auxiliary video is a disparity map or a depth map; encoding the direction information and distance information about the audio signal, and sending the encoded information. The apparatus for generating audio signals includes an audio signal distance information obtaining module and an audio signal encoding module. With the present invention, the position information, including direction information and distance information, about the audio signal may be obtained accurately in combination with a three-dimensional video signal and a three-dimensional audio signal, without increasing the size of a microphone array, and the audio signal is sent and played.

7 Claims, 20 Drawing Sheets

(56) References Cited

U.S. PATENT DOCUMENTS

| | | | |
|---|---|---|---|
| 6,707,489 B1 | 3/2004 | Maeng et al. | |
| 2003/0053680 A1* | 3/2003 | Lin et al. | 382/154 |
| 2003/0138108 A1* | 7/2003 | Gentle | 381/23 |
| 2006/0167695 A1 | 7/2006 | Spille et al. | |
| 2007/0160236 A1 | 7/2007 | Iida et al. | |

FOREIGN PATENT DOCUMENTS

| | | |
|---|---|---|
| CN | 101203071 A | 6/2008 |
| CN | 101350931 A | 1/2009 |
| JP | 8289275 A | 11/1996 |
| JP | 2007-158527 | 6/2007 |
| WO | WO03017680 A1 | 2/2003 |
| WO | WO2007088730 A1 | 8/2007 |
| WO | WO2010022633 A1 | 3/2010 |
| WO | WO2010025654 A1 | 3/2010 |

OTHER PUBLICATIONS

First Chinese Office Action dated (mailed) Oct. 16, 2009, issued in related Chinese Application No. 200810119140.5 Huawei Technologies Co., LTD.

International Search Report for International Application No. PCT/CN2009073406, mailed Dec. 3, 2009 Huawei Technologies Co., LTD.

Written Opinion of the International Searching Authority (translation) dated (mailed) Dec. 3, 2009, issued in related Application No. PCT/CN2009/073406, filed Aug. 21, 2009, Shenzhen Huawei Technologies Co., Ltd. (6 pgs.).

First Chinese Office Action dated (mailed) Jul. Nov. 9, 2010, issued in related Chinese Application No. 200810119140.5, Huawei Technologies Co., Ltd. (6 pgs.).

* cited by examiner

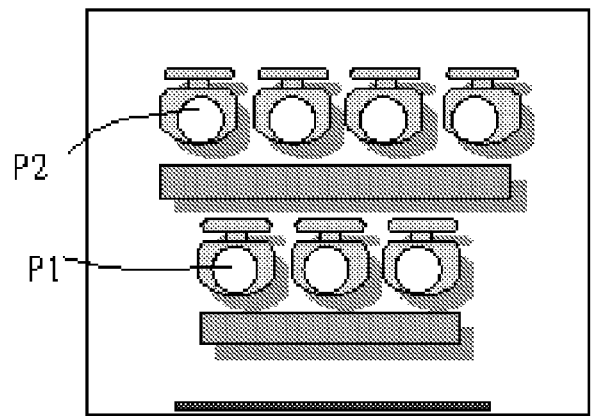
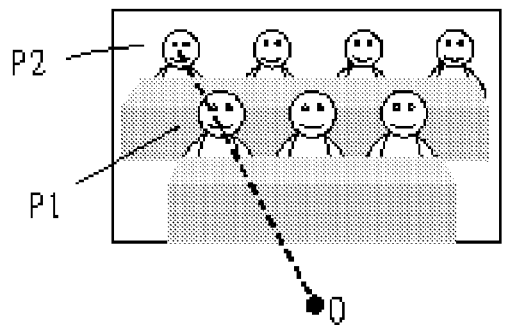
FIG. 1A (Prior Art)    FIG. 1B (Prior Art)
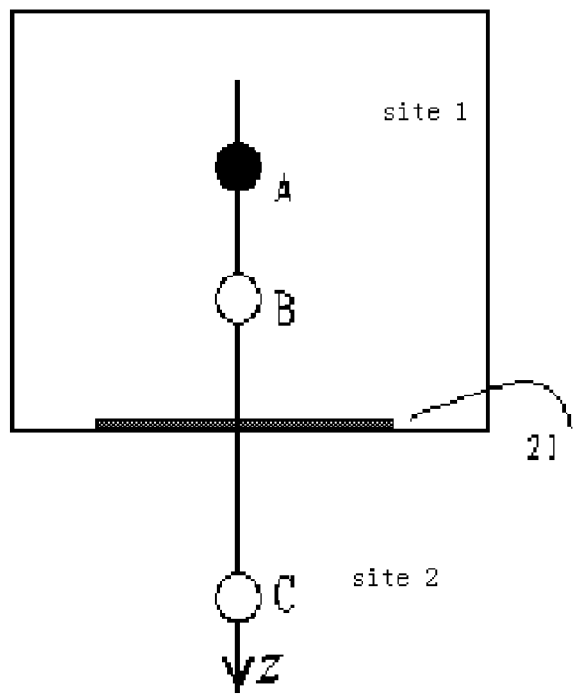
FIG. 2 (Prior Art)

US 8,705,778 B2

METHOD AND APPARATUS FOR GENERATING AND PLAYING AUDIO SIGNALS, AND SYSTEM FOR PROCESSING AUDIO SIGNALS

CROSS-REFERENCE TO RELATED APPLICATIONS

This application is a continuation of International Application No. PCT/CN2009/073406, filed on Aug. 21, 2009, which claims priority to Chinese Patent Application No. 200810119140.5, filed on Aug. 27, 2008, both of which are hereby incorporated by reference in their entireties.

FIELD OF THE INVENTION

The present invention relates to the field of communication technologies, and in particular to a method and an apparatus for generating and playing audio signals, and a system for processing audio signals.

BACKGROUND

Three-dimensional video technologies can provide pictures with depth information that complies with a stereoscopic principle. Three-dimensional technologies use a microphone array to pick up a sound, and can obtain an enhanced sound and information about direction and distance of the sound by using a beam-forming method. A speaker array is used to replay the sound, and methods such as wave field synthesis are used to replay the sound with a sense of direction and a sense of distance. Some experimental systems regarding three-dimensional videos or three-dimensional audios are already available in the prior art.

FIG. 1A is a horizontal view corresponding to an original site layout diagram in the prior art. As shown in FIG. 1A, seven persons attend the conference. Participant P1 is seated at the first row, and participant P2 is seated at the last row. FIG. 1B illustrates a scene of the site shown in FIG. 1A on a screen at a reproduction site in the prior art. If a participant is seated at point O at the reproduction site, it should be noted that point O, P1, and P2 are exactly located on the same straight line. During the reproduction of the sound field, if the distance of the sound at the reproduction site is not processed or is poorly processed, the voices of P1 and P2 do not match the positions of P1 and P2. In this case, when P1 and/or P2 speaks, the participant seated at point O is unable to distinguish who is speaking. In addition, a similar problem occurs when the scene is reproduced by using a three-dimensional video. FIG. 2 is a planform of a site layout in the prior art. According to the stereoscopic imaging and display principles, when an object at site 1 is displayed at site 2 by using the three-dimensional display technology, participants at site 2 may look like being seated before display 21, for example, at position C, or after display 21, for example, at position B. Supposing the object in FIG. 2 is a participant who is seated at position A at site 1, when the object is reproduced at site 2, if it is displayed at a position before the display, for example, position C, but the sound is sent from position B, communications and discussions between participants at site 2 and participants at site 1 may be affected.

During the implementation of the present invention, the inventor discovers the following problems in the prior art: To obtain more accurate information about the direction and distance of a sound, the number of microphones and/or the space between microphones in the microphone array is generally increased. For a microphone array, the greater the number of microphones is, the larger the space between microphones is, and the more accurate the judgment about the direction and distance of the sound is. However, the size of the microphone array is also increased. Conversely, if the number of microphones and the space between microphones are decreased, the accuracy of the direction and distance of the sound obtained by the microphone array may be reduced. Thus, to replay the sound in a scene where the distance of the sound needs to be considered, for example, in a scene where the speechmaker is allowed to move freely, or in a conferencing system with multiple rows as shown in FIG. 1A, or in a three-dimensional video display system as shown in FIG. 1B, listeners are unable to determine the position of the speechmaker immediately and accurately. Thus, the eye to eye effect of the communication is affected.

SUMMARY OF THE INVENTION

Embodiments of the present invention provide a method and an apparatus for generating and playing audio signals, and a system for processing audio signals, so that the position information, including direction information and distance information, about an audio signal may be obtained more accurately without increasing the size of a microphone array.

An embodiment of a present invention provides a method for generating audio signals, including:

generating distance information about an audio signal corresponding to a view point position, according to the obtained auxiliary video and direction information about the audio signal, where the auxiliary video is a disparity map or a depth map; and encoding the audio signal, the direction information about the audio signal, and the distance information about the audio signal, and sending the encoded information.

An embodiment of a present invention provides an apparatus for generating audio signals, including: an audio signal distance information obtaining module, configured to generate distance information about an audio signal corresponding to a view point position, according to obtained auxiliary video and direction information about the audio signal, where the auxiliary video is a disparity map or a depth map; and an audio signal encoding module, configured to encode the audio signal, the direction information about the audio signal, and the distance information about the audio signal, and send the encoded information.

An embodiment of a present invention provides a method for playing audio signals, including:

decoding received encoded data, and obtaining an audio signal and direction information about the audio signal;

obtaining distance information about the audio signal;

processing the audio signal by using an audio signal reproduction method, according to the direction information and distance information about the audio signal, and obtaining speaker signals corresponding to each speaker; and playing the speaker signals by using a speaker array or a surround stereo system.

An embodiment of a present invention provides an apparatus for playing audio signals, including:

an audio signal decoding module, configured to decode received encoded data, and obtain an audio signal and direction information about the audio signal;

an audio signal distance information obtaining module, configured to obtain the distance information about the audio signal;

a speaker signal obtaining module, configured to: receive the audio signal and the direction information about the audio signal from the audio signal decoding module, receive the distance information about the audio signal from the audio signal distance information obtaining module, process the audio signal by using an audio signal reproduction method, and obtain speaker signals corresponding to each speaker; and a speaker signal playing module, configured to play the speaker signals by using a speaker array or a surround stereo system.

An embodiment of a present invention provides a system for processing audio signals, including an apparatus for generating audio signals and an apparatus for playing audio signals.

The apparatus for generating audio signals includes: an audio signal distance information obtaining module, configured to generate distance information about an audio signal corresponding to a view point position, according to obtained auxiliary video and direction information about the audio signal, where the auxiliary video is a disparity map or a depth map; and an audio signal encoding module, configured to encode the audio signal, the direction information about the audio signal, and the distance information about the audio signal, and send the encoded information.

The apparatus for playing audio signals includes: an audio signal decoding module, configured to decode the received encoded data, and obtain the audio signal and the direction information about the audio signal; an audio signal distance information obtaining module, configured to obtain the distance information about the audio signal; a speaker signal obtaining module, configured to process the audio signal by using an audio signal reproduction method, according to the direction information and distance information about the audio signal, and obtain speaker signals corresponding to each speaker; and a speaker signal playing module, configured to play the speaker signals by using a speaker array or a surround stereo system.

According to embodiments of the present invention, the position information, including direction information and distance information, about the audio signal may be obtained accurately in combination with a three-dimensional video signal and a three-dimensional audio signal, without increasing the size of the microphone array, and the audio signal is sent and played.

BRIEF DESCRIPTION OF THE DRAWINGS

To describe the technical solution under the present invention or in the prior art more clearly, the following outlines the accompanying drawings involved in the embodiments of the present invention or in the prior art. Apparently, the accompanying drawings outlined below are not exhaustive, and persons of ordinary skill in the art can derive other drawings from such accompanying drawings without any creative effort.

FIG. 1A is a horizontal view corresponding to an original site layout diagram in the prior art;

FIG. 1B illustrates a scene of the site shown in FIG. 1A on a screen at a reproduction site in the prior art;

FIG. 2 is a planform of a site layout in the prior art;

DESCRIPTION OF THE EMBODIMENTS

The technical solution under the present invention is described in detail below with reference to the accompanying drawings. Apparently, the embodiments described below are exemplary only, without covering all embodiments of the present invention. Persons having ordinary skill in the art can derive other embodiments from the embodiments given herein without making any creative effort, and all such embodiments fall in the scope of the present invention.

Embodiment 1 of the Method for Generating Audio Signals

Figure 3:
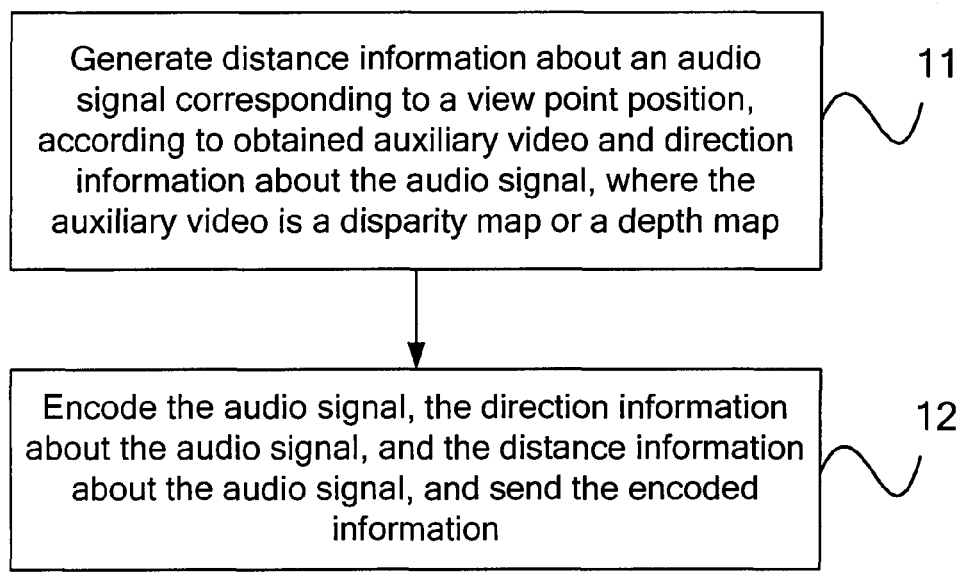
FIG. 3 is a flowchart of a method for generating audio signals according to a first embodiment of the present invention.

FIG. 3 is a flowchart of a method for generating audio signals according to a first embodiment of the present invention. The method includes the following steps:

11. Generate distance information about an audio signal corresponding to a view point position, according to obtained auxiliary video and direction information about the audio signal, where the auxiliary video is a disparity map or a depth map.

12. Encode the audio signal, the direction information about the audio signal, and the distance information about the audio signal, and send the encoded information.

In this embodiment, the direction information about the audio signal is obtained accurately, according to the obtained auxiliary video and the direction information about the audio signal, without increasing the size of the microphone array, and the audio signal is sent.

Embodiment 2 of the Method for Generating Audio Signals

Figure 4A:
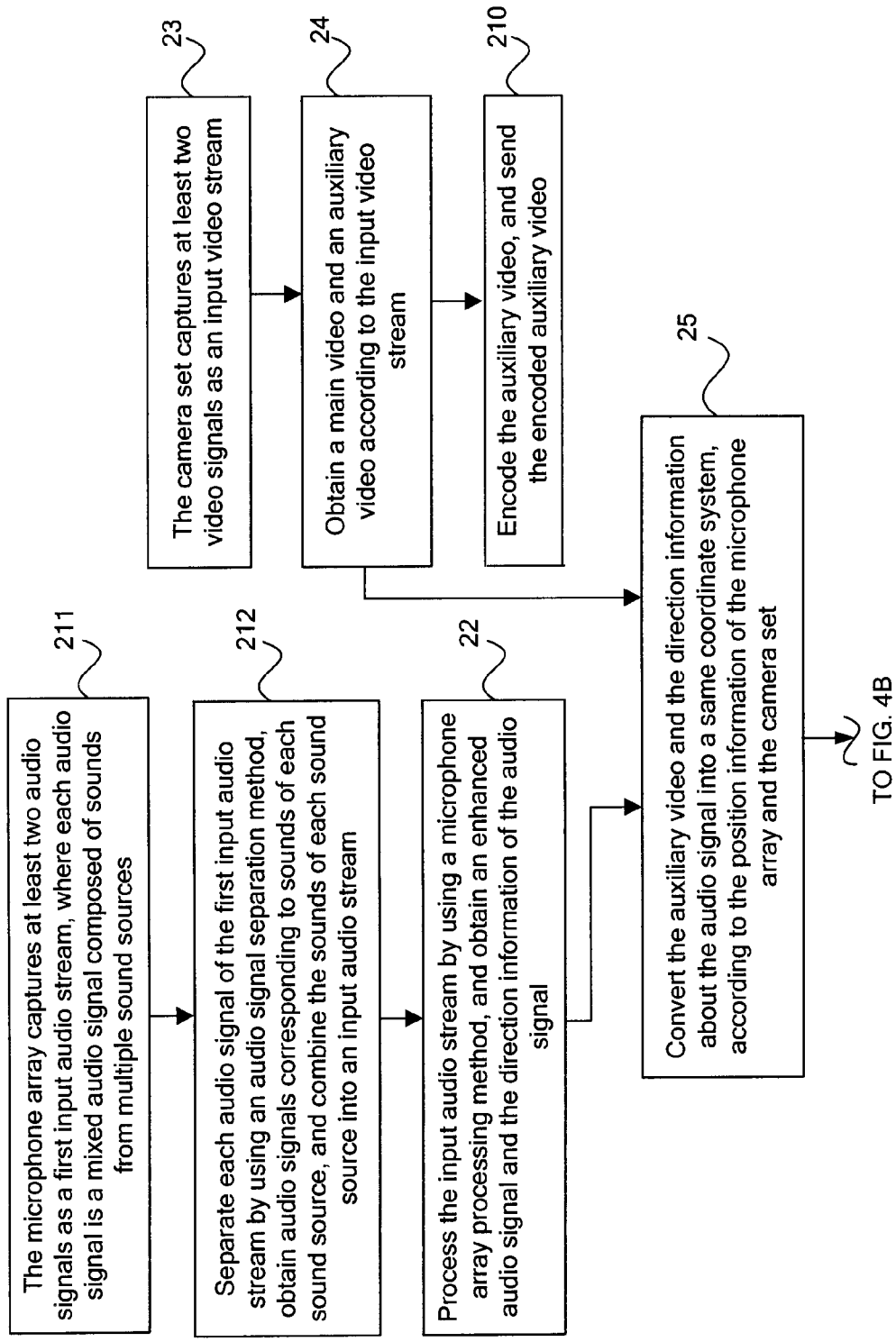
FIGS. 4A and 4B are a flowchart of a method for generating audio signals according to a second embodiment of the present invention.
Figure 4B:
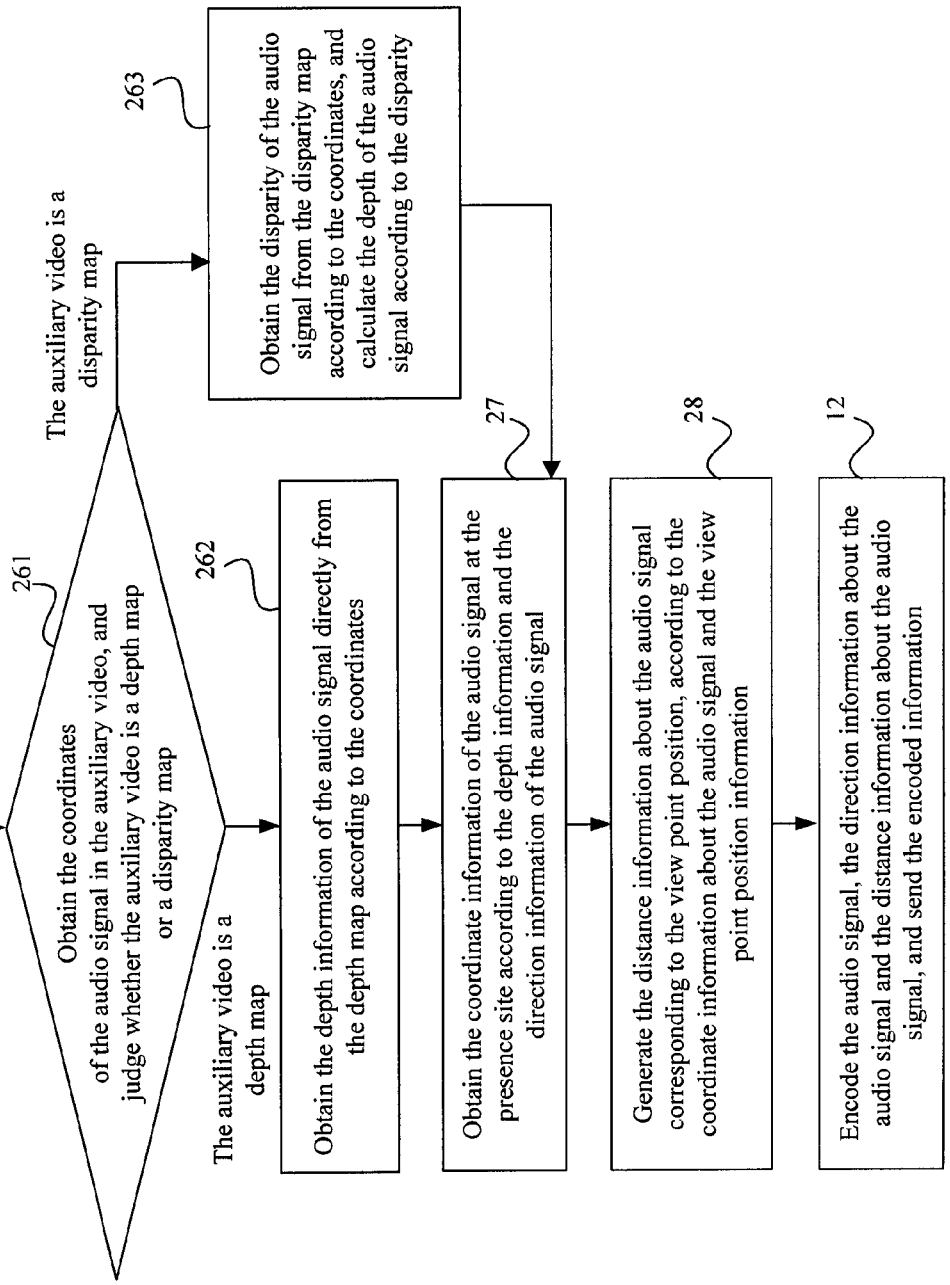

FIG. 4 is a flowchart of a method for generating audio signals according to a second embodiment of the present invention. On the basis of the technical solution shown in FIG. 3, the method may include the following steps before step 11:

21. The microphone array captures at least two audio signals as an input audio stream.

22. Process the input audio stream by using a microphone array processing method, and obtain an enhanced audio signal and the direction information about the audio signal.

23. The camera set captures at least two video signals as an input video stream.

24. Obtain a main video and an auxiliary video according to the input video stream.

Optionally, on the basis of the technical solution shown in FIG. 3, step 11 may specifically include the following sub-steps:

26. Obtain the depth information about the audio signal, according to the auxiliary video and the direction information about the audio signal.

27. Obtain the coordinate information about the audio signal at the presence site, according to the depth information and the direction information about the audio signal.

28. Generate the distance information about the audio signal corresponding to the view point position, according to the coordinate information about the audio signal and the view point position information.

Optionally, the method may further include the following steps before step 26:

25. Convert the auxiliary video and the direction information about the audio signal into the same coordinate system, according to the position information about the microphone array and the camera set.

Optionally, step 26 may specifically include the following sub-steps:

261. Obtain the coordinates of the audio signal in the auxiliary video according to the direction information about the audio signal, and judge whether the auxiliary video is a depth map or a disparity map. If the auxiliary video is a depth map, step 262 is performed; otherwise, step 263 is performed.

262. Obtain the depth information about the audio signal directly from the depth map according to the coordinates.

263. Obtain the disparity of the audio signal from the disparity map according to the coordinates, and calculate the depth of the audio signal according to the disparity.

Optionally, step 21 may specifically include the following sub-steps:

211. The microphone array captures at least two audio signals as a first input audio stream, where each audio signal is a mixed audio signal composed of sounds from multiple sound sources.

212. Separate each audio signal from the first input audio stream by using an audio signal separation method, obtain audio signals corresponding to sounds of each sound source, and combine the sounds of each sound source into an input audio stream.

In step 21 and step 22, the simplest case is that the microphone array is composed of two microphones. Thus, the input audio stream includes at least two audio signals; the microphone array processing method such as the beam-forming method is used to process the input audio stream; an enhanced audio signal and the direction information about the audio signal are obtained.

In step 23 and step 24, the simplest case is that the camera set is composed of two cameras. Thus, the input video stream includes at least two video signals. The main video and the auxiliary video are obtained according to the input video stream; one auxiliary video may be obtained when there are two cameras; if a camera set is composed of more than two cameras, multiple auxiliary videos may be obtained. In addition, one or multiple video streams of the input video streams are selected as the main video. The simplest case is as follows: If there are two cameras, the video captured by one of the two cameras is used as the main video.

It should be noted that step 21 and step 22 may be performed before, during or after step 23 and step 24 and the same technical effect may be achieved.

Figure 5:
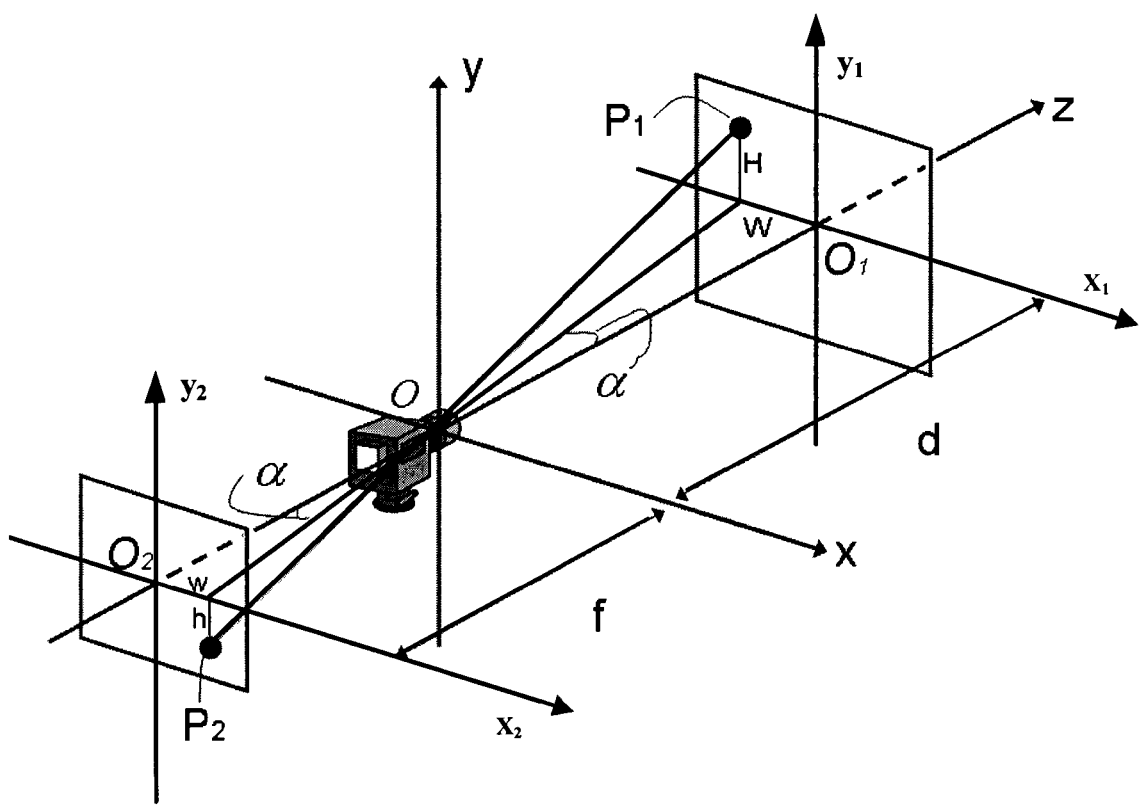
FIG. 5 is a schematic diagram illustrating the calculation of the horizontal coordinate of an audio signal in an auxiliary video in the method for generating audio signals according to the second embodiment of the present invention.

The following describes a specific process of obtaining the distance information about the audio signal in step 26 to step 28 in this embodiment. FIG. 5 is a schematic diagram illustrating the calculation of the horizontal coordinate of an audio signal in the auxiliary video in the method for generating audio signals according to the second embodiment of the present invention. In FIG. 5, point O corresponds to the center of the camera lens; axis z corresponds to the vertical direction of the camera lens; the plane formed by axis x and axis y is vertical to axis z. The plane where point $O_1$ is located is the plane where sound source point $P_1$ is located and the plane is vertical to axis z. The distance between this plane and point O along axis z is the object distance, that is d. The plane where point $O_2$ is located is the plane where imaging point $P_2$ of the sound source point is located and the plane is vertical to axis z. The distance between this plane and point O along axis z is the image distance, which is equal to the focal length f of the camera. The distance from $P_1$ to axis $x_1$ and the distance from $P_1$ to axis $y_1$ are set to H and W respectively. The distance from $P_1$ to axis $x_2$ and the distance from $P_1$ to axis $y_2$ along imaging point $P_2$ are set to h and w respectively. The included angle between the projection of vector $\overrightarrow{OP_1}$ between point O and point $P_1$ on the XZ plane and axis z measured by the microphone array is $\angle \alpha$. Therefore, w may be obtained by the following formula according to the feature of the right triangle:

$$w = f \cdot \tan(\alpha) \qquad (1)$$

Figure 6:
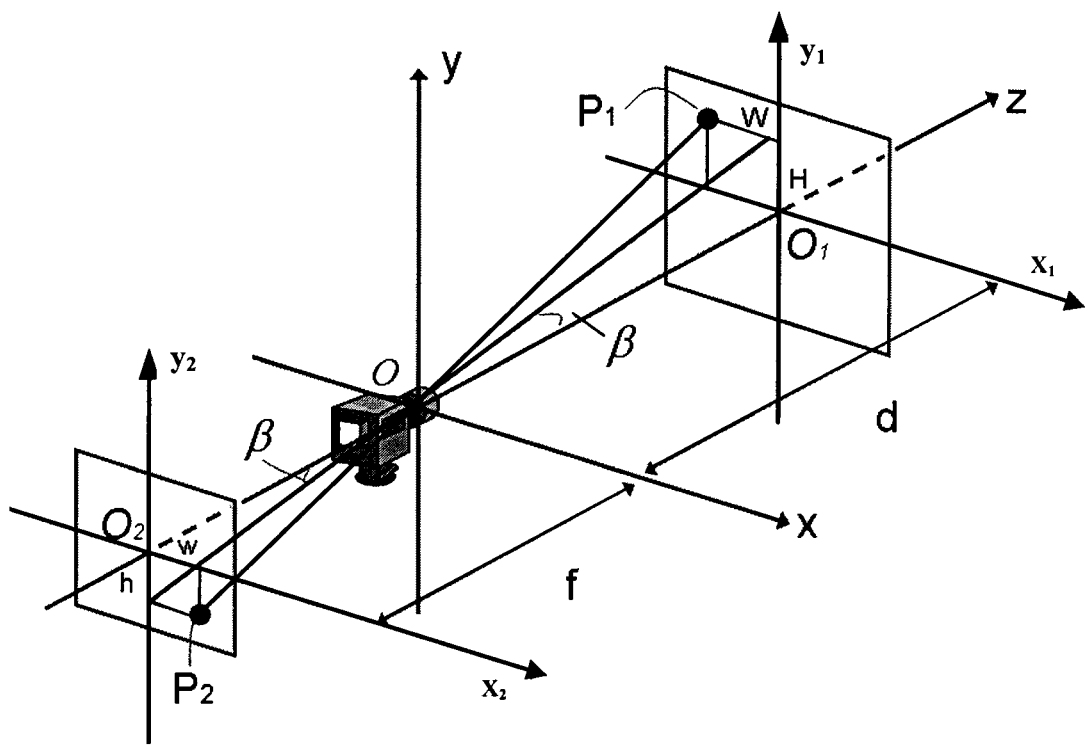
FIG. 6 is a schematic diagram illustrating the calculation of the vertical coordinate of the audio signal in the auxiliary video in the method for generating audio signals according to the second embodiment of the present invention.

FIG. 6 is a schematic diagram illustrating the calculation of the vertical coordinate of the audio signal in the auxiliary video in the method for generating audio signals according to the second embodiment of the present invention. The included angle between the projection of vector $\overrightarrow{OP_1}$ between point O and point $P_1$ on the YZ plane and axis z measured by the microphone array is $\angle\beta$. Therefore, h may be obtained by the following formula according to the feature of the right triangle:

$$h = f \cdot \tan(\beta) \tag{2}$$

The coordinates of imaging point $P_2$ corresponding to a signal sound source point $P_1$ may be obtained by using formulas (1) and (2), that is, (w, h). Because the auxiliary video and the camera have the same image size and position information, the coordinates (w, h) of $P_2$ are the coordinates of a point corresponding to $P_1$ in the auxiliary video.

If the auxiliary video is a depth map, the depth information corresponding to $P_1$ is obtained directly from the depth map according to the coordinates.

If the auxiliary video is a disparity map, the disparity corresponding to $P_1$ is obtained from the disparity map according to the coordinates. The depth information is calculated by the following formula according to the disparity:

$$z_p = -D \cdot \frac{p}{x_B - p} \tag{3}$$

In formula (3), $z_p$ denotes the depth; p denotes the disparity; D denotes the distance between the view point and the display; $x_B$ denotes the distance between two eyes of a person.

Figure 7:
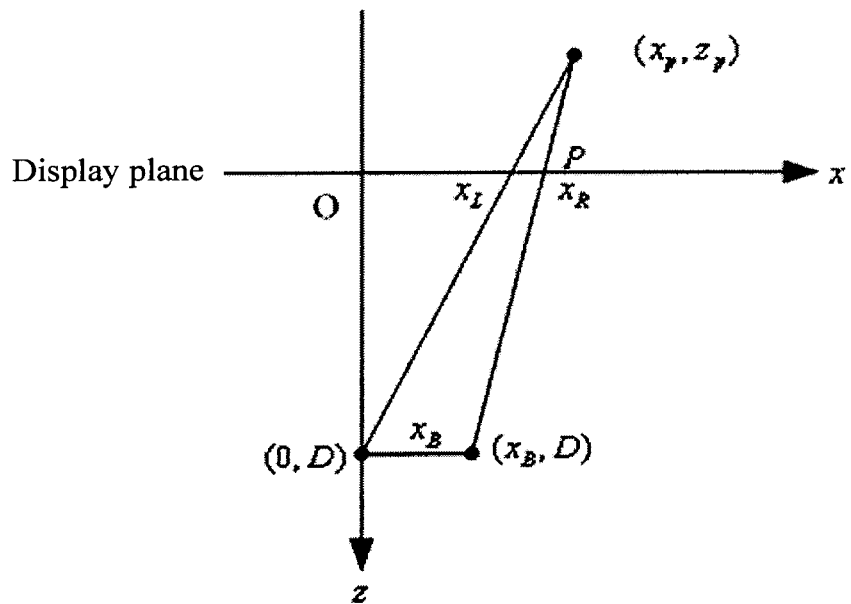
FIG. 7 is a schematic diagram illustrating a relationship among the image disparity, depth, and the distance between a view point and a display in a parallel camera system in the method for generating audio signals according to the second embodiment of the present invention.

The following describes the deducing process of formula (3). FIG. 7 is a schematic diagram illustrating a relationship among the image disparity, depth, and the distance between the view point and the display in a parallel camera system in the method for generating audio signals according to the second embodiment of the present invention. In FIG. 7, origin O of the system is located on the display screen; axis Z faces the view point; axis X corresponds to the display screen; $z_p$ denotes the depth; p denotes the disparity; D denotes the distance between the view point and the display; $x_B$ denotes the distance between two eyes of a person. The coordinates of the two eyes in the coordinate system are (0,D) and ($x_B$,D). The position of the audio signal is ($x_p$,$z_p$); $x_L$ and $x_R$ denote the coordinates of the view points in the left eye view and right eye view on the display screen; distance p between $x_L$ and $x_R$ denotes the disparity.

The following formulas are obtained according to simple geometric relationships:

$$\frac{x_L}{D} = \frac{x_p}{D - z_p}$$

and $$\frac{x_R - x_B}{D} = \frac{x_B}{D - z_p}$$

The following formula is obtained by combining the above two formulas:

$$\frac{x_L - x_R + x_B}{D} = \frac{x_B}{D - z_p}$$

If $p = x_R - x_L$, the relationship between p and $z_p$ is as follows:

$$p = x_B \left(1 - \frac{D}{D - z_p}\right)$$

The above formula is further expressed as follows:

$$z_p = -D \cdot \frac{p}{x_B - p}$$

Figure 8:
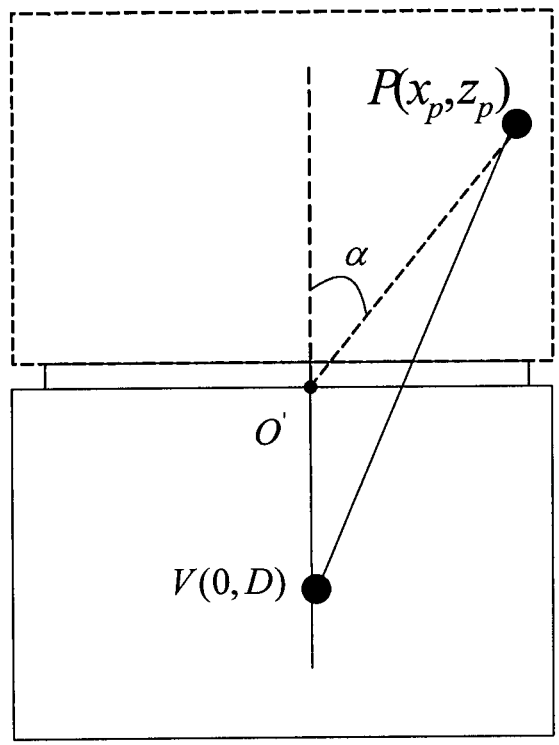
FIG. 8 is an XZ plane diagram illustrating the calculation of the distance of the audio signal in the method for generating audio signals according to the second embodiment of the present invention.

FIG. 8 is an XZ plane diagram illustrating the calculation of the distance of the audio signal in the method for generating audio signals according to the second embodiment of the present invention. In FIG. 8, P($z_p$,$y_p$) denotes the coordinate information about the audio signal, where $z_p$ is already obtained. If the included angle between the projection of vector $\overrightarrow{OP}$ between point O and point P($x_p$,$z_p$) on the XZ plane and axis Z measured by the microphone array is $\angle\alpha$, the horizontal coordinate $x_p$ of the audio signal is calculated by the following formula:

$$x_p = z_p \cdot \tan(\alpha)$$

In this way, after the coordinate information ($x_p$,$z_p$) of the audio signal is obtained, a view point at the site is located after point V(0,D). On the XZ plane, the distance information about the audio signal is the vector between V and P, that is, $\overrightarrow{VP}$.

Figure 9:
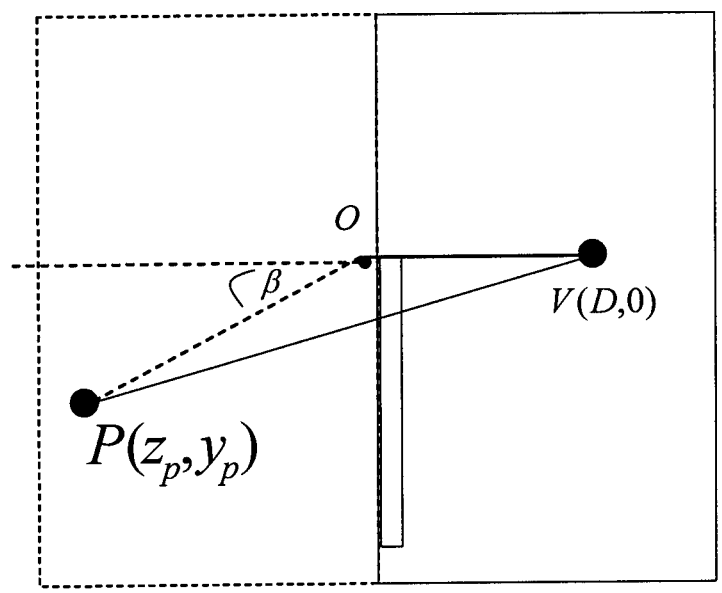
FIG. 9 is an YZ plane diagram illustrating the calculation of the distance of the audio signal in the method for generating audio signals according to the second embodiment of the present invention.

FIG. 9 is an YZ plane diagram illustrating the calculation of the distance of the audio signal in the method for generating audio signals according to the second embodiment of the present invention. In FIG. 9, a playback sound source point P($z_p$,$y_p$) denotes the coordinate information about the audio signal. If the included angle between the projection of vector $\overrightarrow{OP}$ between point O and point P($z_p$,$y_p$) on the XZ plane and axis Z measured by the microphone array is $\angle\beta$, the vertical coordinate of the audio signal at the presence site is calculated by the following formula:

$$y_p = z_p \cdot \tan(\beta)$$

In this way, after the coordinate information ($z_p$,$y_p$) of the audio signal is obtained, a view point at the site is located after point V(0,D). On the YZ plane, the distance information about the audio signal is the vector between V and P, that is, $\overrightarrow{VP}$.

Optionally, the method in this embodiment may further include the following steps:

210. Encode the auxiliary video, and send the encoded video.

In this embodiment, the input audio stream and input video stream are obtained by using the microphone array and the camera set; the auxiliary video and the direction information about the audio signal are obtained, according to the input video stream and input audio stream; the distance information about the audio signal is calculated, according to the auxiliary video and the direction information about the audio signal. In this way, the position information, including direction information and distance information, about the audio signal can be obtained accurately in combination with the three-dimensional video signal and three-dimensional audio signal, without increasing the size of the microphone array, and the audio signal is sent.

In addition, in this embodiment, when there are multiple non-noise sound sources in the environment where the microphone array is located, for example, when multiple persons are speaking, the audio signal separation method is used to separate audio signals corresponding to the sounds of each sound source from the first input audio stream captured by the microphone array; the audio signals corresponding to the sounds of each sound source are combined into an input audio stream; the input audio stream is processed. In this way, the position information, including direction information and distance information, about the audio signals corresponding to the sounds of each sound source is obtained accurately.

Further, the coordinate system used when the microphone array measures the direction of a sound source during actual system layout may not match the coordinate system of the camera system. Thus, the two coordinate systems need to be converted to ensure that the calculations are performed under the same coordinate system.

In embodiments of the present invention, the position information, including direction information and distance information, about the audio signal may be obtained accurately in combination with a three-dimensional video signal and a three-dimensional audio signal, without increasing the size of the microphone array, and the audio signal is sent and played.

Embodiment 3 of the Method for Generating Audio Signals

Figure 10A:
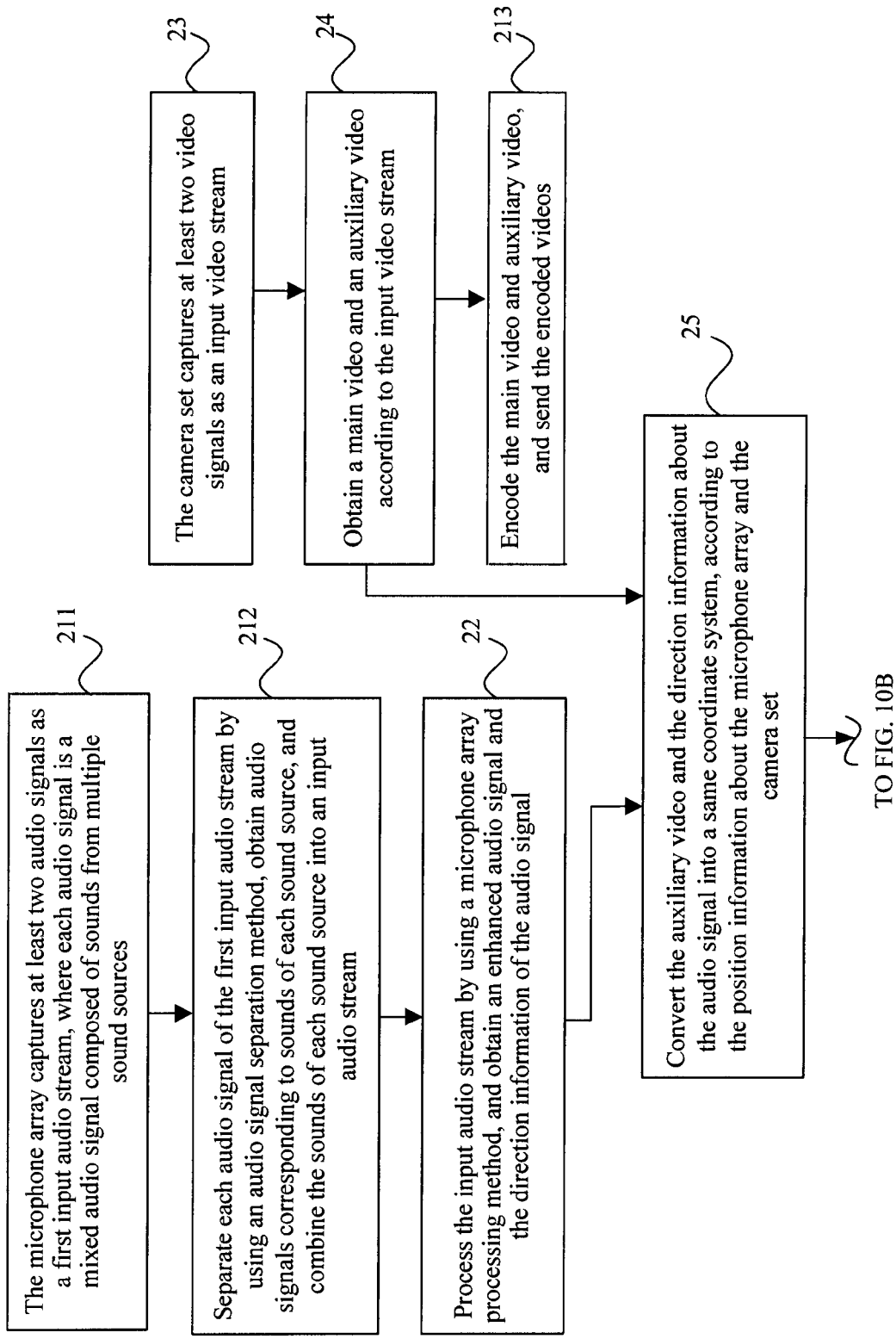
FIGS. 10A and 10B are a flowchart of the method for generating audio signals according to a third embodiment of the present invention.
Figure 10B:
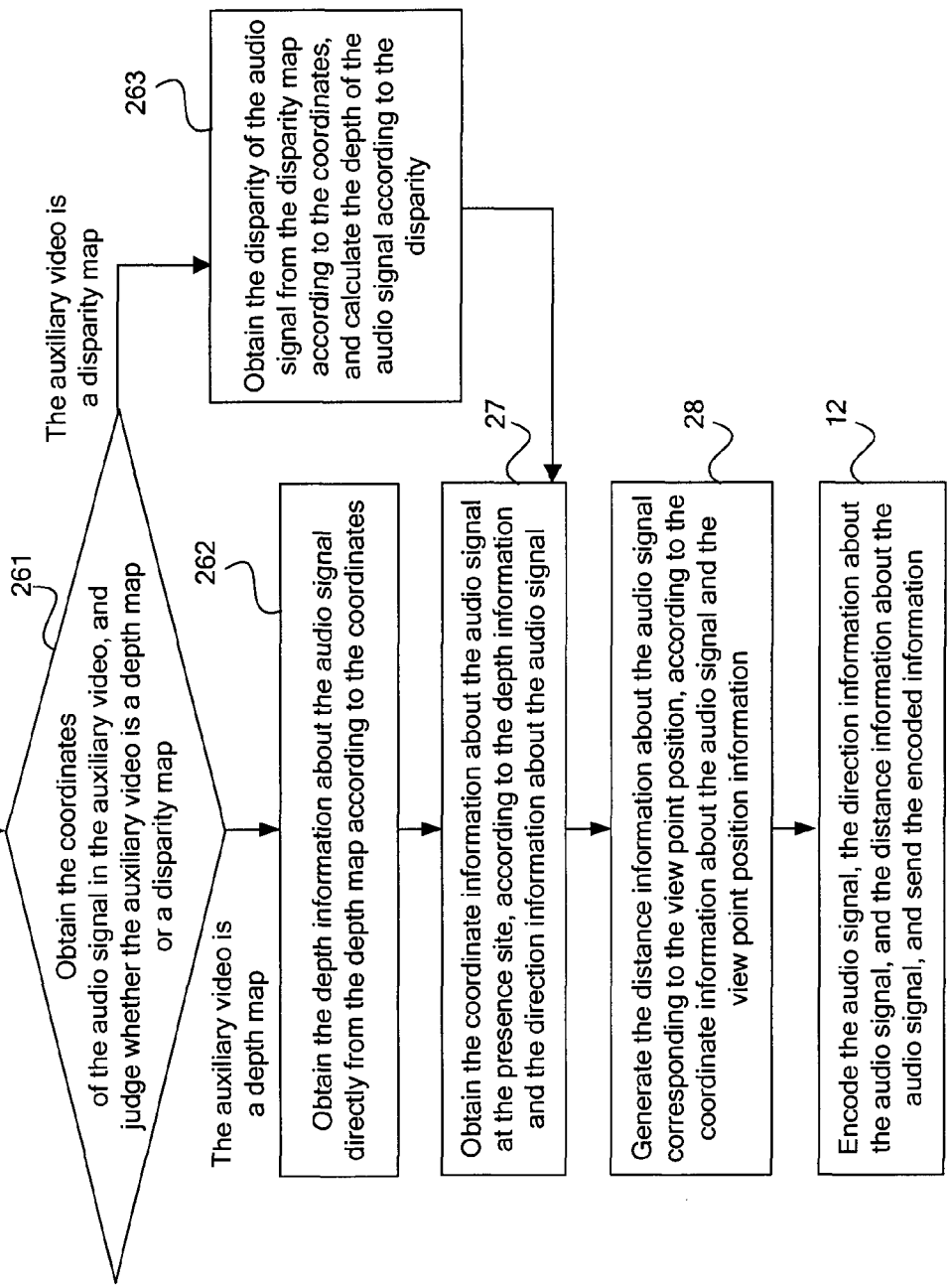

Optionally, FIG. 10 is a flowchart of the method for generating audio signals according to a third embodiment of the present invention. On the basis of the technical solution shown in FIG. 4, step 210 may also be:

213. Encode the main video and auxiliary video, and send the encoded video.

In this embodiment, the position information, including direction information and distance information, about the audio signal may be obtained accurately in combination with a three-dimensional video signal and a three-dimensional audio signal, without increasing the size of the microphone array, and the audio signal and video signal are sent and played.

Embodiment 1 of the Apparatus for Generating Audio Signals

Figure 11:
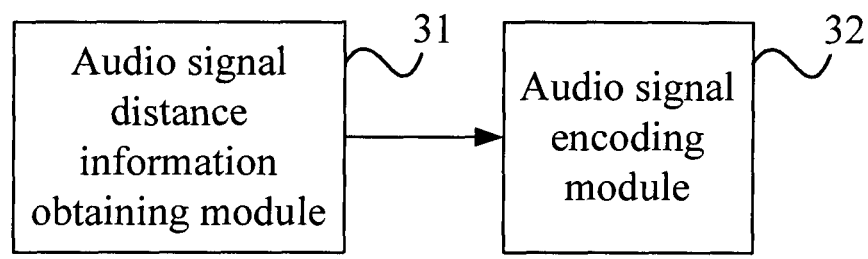
FIG. 11 illustrates a structure of an apparatus for generating audio signals according to a first embodiment of the present invention.

FIG. 11 shows a structure of an apparatus for generating audio signals according to a first embodiment of the present invention. The apparatus may include an audio signal distance information obtaining module 31 and an audio signal encoding module 32. The audio signal encoding module 32 is connected with the audio signal distance information obtaining module 31. The audio signal distance information obtaining module 31 is configured to generate the distance information about an audio signal corresponding to a view point position, according to the obtained auxiliary video and direction information about the audio signal, where the auxiliary video is a disparity map or a depth map. The audio signal encoding module 32 is configured to encode the audio signal, the direction information about the audio signal, and the distance information about the audio signal, and send the encoded information.

In this embodiment, the audio signal distance information obtaining module 31 generates distance information about the audio signal, according to the obtained auxiliary video and the direction information about the audio signal. The audio signal encoding module 32 encodes the audio signal, the direction information about the audio signal, and the distance information about the audio signal, and sends the encoded information. In this way, the position information, including direction information and distance information, about the audio signal may be obtained accurately in combination with the three-dimensional video signal and the three-dimensional audio signal, without increasing the size of the microphone array, and the audio signal is sent.

Embodiment 2 of the Apparatus for Generating Audio Signals

Figure 12:
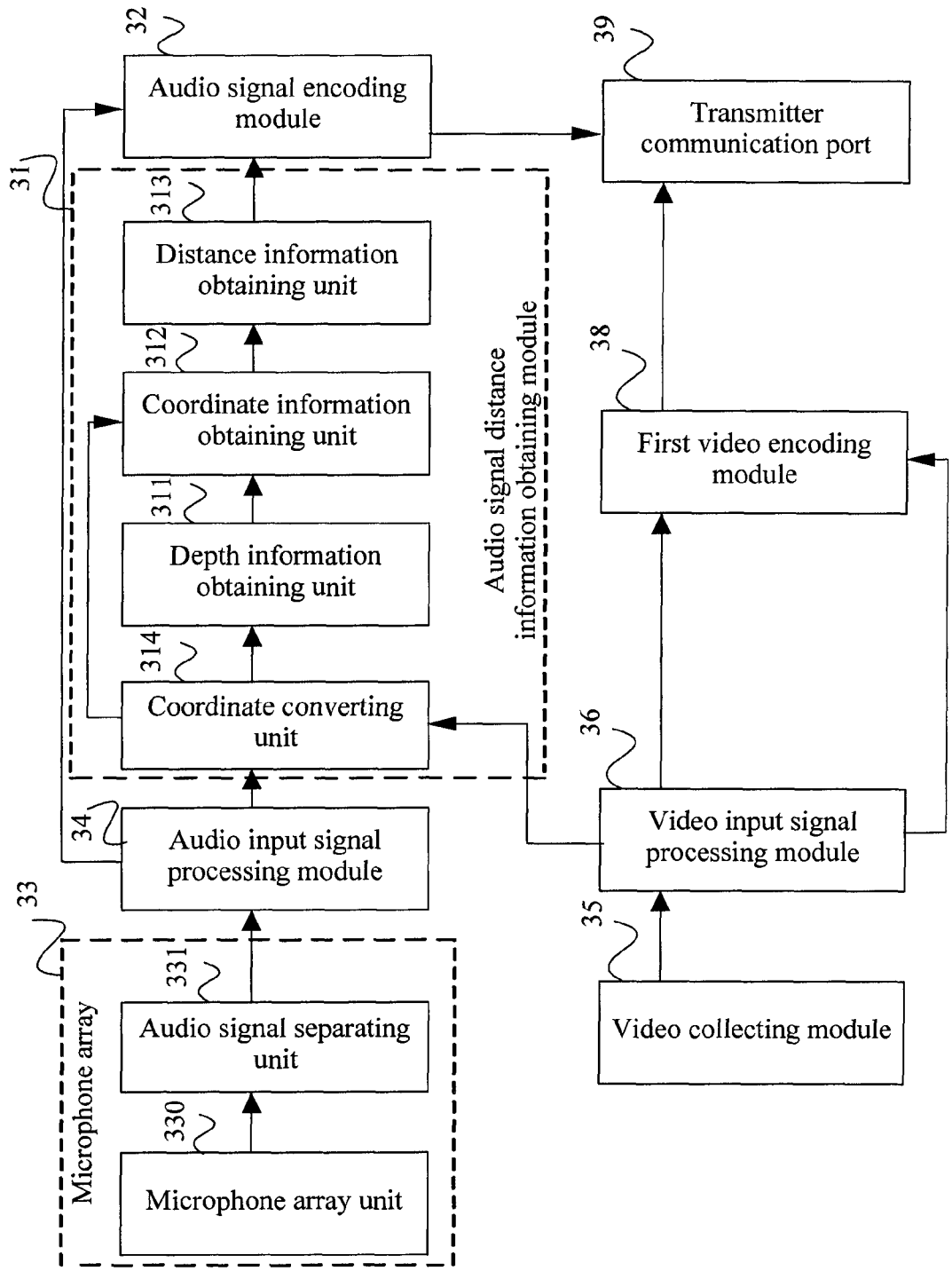
FIG. 12 illustrates a structure of an apparatus for generating audio signals according to a second embodiment of the present invention.

FIG. 12 shows a structure of an apparatus for generating audio signals according to a second embodiment of the present invention. On the basis of the structure shown in FIG. 11, the audio signal distance information obtaining module 31 may include a depth information obtaining unit 311, a coordinate information obtaining unit 312, and a distance information obtaining unit 313. The coordinate information obtaining unit 312 is connected with the depth information obtaining unit 311, and the distance information obtaining unit 313 is connected with the coordinate information obtaining unit 312. The depth information obtaining unit 311 is configured to obtain the depth information about the audio signal, according to the auxiliary video and the direction information about the audio signal. The coordinate information obtaining unit 312 is configured to obtain the coordinate information about the audio signal at the presence site, according to the depth information and the direction information about the audio signal. The distance information obtaining unit 313 is configured to generate distance information about the audio signal corresponding to the view point position, according to the coordinate information about the audio signal and the view point position information, and send the distance information about the audio signal to the audio signal encoding module 32.

In this embodiment, the apparatus may further include a microphone array 33, an audio input signal processing module 34, a video collecting module 35, and a video input signal processing module 36. The audio input signal processing module 34 is connected with the microphone array 33, and the video input signal processing module 36 is connected with the video collecting module 35. The microphone array 33 is configured to capture at least two audio signals as an input audio stream. The audio input signal processing module 34 is configured to: process the input audio stream by using a microphone array processing method, obtain an enhanced audio signal and direction information about the audio signal, and send the audio signal and the direction information about the audio signal to the audio signal encoding module 32. The video collecting module 35 is used by a camera set to capture at least two video signals as an input video stream. The video input signal processing module 36 is configured to obtain the main video and auxiliary video according to the input video stream.

The microphone array 33 may specifically include a microphone array unit 330 and an audio signal separating unit 331. The microphone array unit 330 is configured to capture at least two audio signals as a first input audio stream, where each audio signal is a mixed audio signal composed of sounds of multiple sound sources. The audio signal separating unit 331 is configured to: separate each audio signal from the first audio stream by using an audio signal separation method, obtain audio signals corresponding to sounds of each sound source, combine the audio signals corresponding to the sounds of each sound source into an input audio stream, and send the input audio stream to the audio input signal processing module 34.

Optionally, the audio signal distance information obtaining module 31 may further include: a coordinate converting unit 314, connected with the video input signal processing module 36 and the audio input signal processing module 34 and configured to: convert the auxiliary video and the direction information about the audio signal into the same coordinate system, according to the position information about the microphone array and the camera set, send the auxiliary video and the direction information about the audio signal whose coordinates are converted, to the depth information obtaining unit 311, and send the direction information about the audio signal whose coordinates are converted, to the coordinate information obtaining unit 312.

Optionally, the apparatus in this embodiment may further include a first video encoding module 38 connected with the video input signal processing module 36 and configured to encode the auxiliary video and send the encoded video.

Optionally, the apparatus in this embodiment may further include a transmitter communication interface 39 connected with the audio signal encoding module 32 and the first video signal encoding module 38 and configured to send the encoded data via the network.

The video collecting module 35 generally shoots the scene by using a camera set composed of two cameras, or may obtain the depth information directly by using a depth camera that can obtain the depth information directly. In this case, the video input signal processing module 36 becomes unnecessary. If the microphone array 33 provides functions of the audio input processing module 34, the audio input signal processing module 34 becomes unnecessary.

In this embodiment, the audio signal distance information obtaining module 31 generates distance information about the audio signal, according to the obtained auxiliary video and the direction information about the audio signal. The audio signal encoding module 32 encodes the audio signal, the direction information about the audio signal, and the distance information about the audio signal, and sends the encoded information. The first video encoding module 38 encodes the auxiliary video, and sends the encoded video. In this way, the position information, including direction information and distance information, about the audio signal may be obtained accurately in combination with the three-dimensional video signal and the three-dimensional audio signal, without increasing the size of the microphone array, and the audio signal and auxiliary video are sent.

Further, the coordinate system used when the microphone array measures the direction of a sound source during actual system layout may not match the coordinate system of the camera system. Thus, the coordinate converting unit 314 converts the two coordinate systems to ensure that the calculations are performed under the same coordinate system.

In this embodiment of the present invention, the position information, including direction information and distance information, about the audio signal may be obtained accurately in combination with the three-dimensional video signal and the three-dimensional audio signal, without increasing the size of the microphone array, and the audio signal is sent and played.

Embodiment 3 of the Apparatus for Generating Audio Signals

Figure 13:
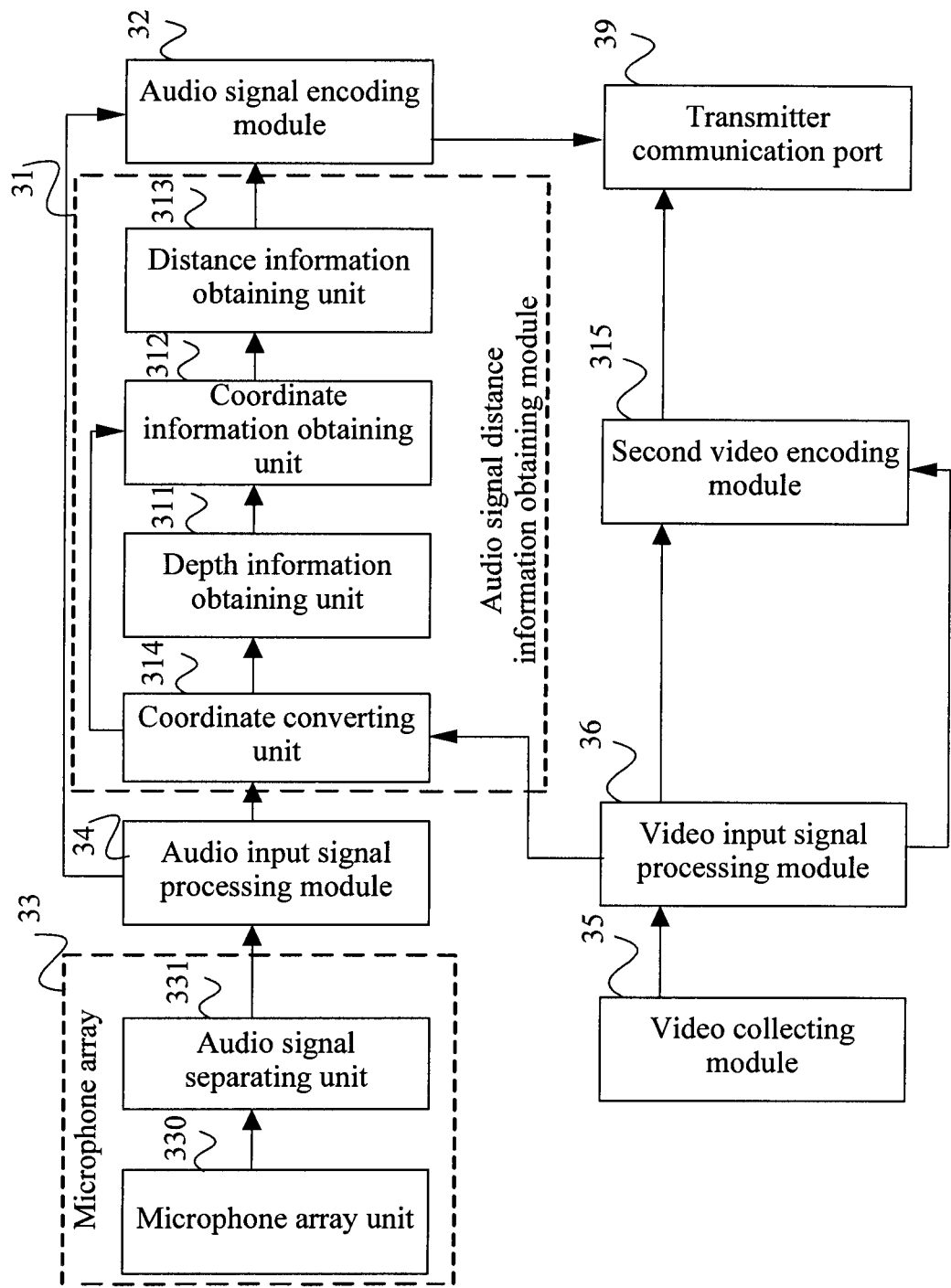
FIG. 13 illustrates a structure of an apparatus for generating audio signals according to a third embodiment of the present invention.

FIG. 13 shows a structure of an apparatus for generating audio signals according to a third embodiment of the present invention. On the basis of the structure shown in FIG. 12, the first video encoding module 38 may also be a second video encoding module 315 and is configured to encode the main video and auxiliary video and send the encoded videos.

On the basis of the structure shown in FIG. 12, the transmitter communication interface 39 is connected with the audio signal encoding module 32 and the second video encoding module 315.

In this embodiment, the audio signal distance information obtaining module 31 generates distance information about the audio signal, according to the obtained auxiliary video and the direction information about the audio signal. The audio signal encoding module 32 encodes the audio signal, the direction information about the audio signal, and the distance information about the audio signal, and sends the encoded information. The second video encoding module 315 encodes the main video and auxiliary video, and sends the encoded videos. In this way, the position information, including direction information and distance information, about the audio signal may be obtained accurately in combination with the three-dimensional video signal and the three-dimensional audio signal, without increasing the size of the microphone array, and the audio signal and video signal are sent.

Further, the coordinate system used when the microphone array measures the direction of a sound source during actual system layout may not match the coordinate system of the camera system. Thus, the coordinate converting unit 314 converts the two coordinate systems to ensure that the calculations are performed under the same coordinate system.

In embodiments of the present invention, the position information, including direction information and distance information, about the audio signal may be obtained accurately in combination with a three-dimensional video signal and a three-dimensional audio signal, without increasing the size of the microphone array, and the audio signal is sent and played.

Embodiment 1 of the Method for Playing Audio Signals

Figure 14:
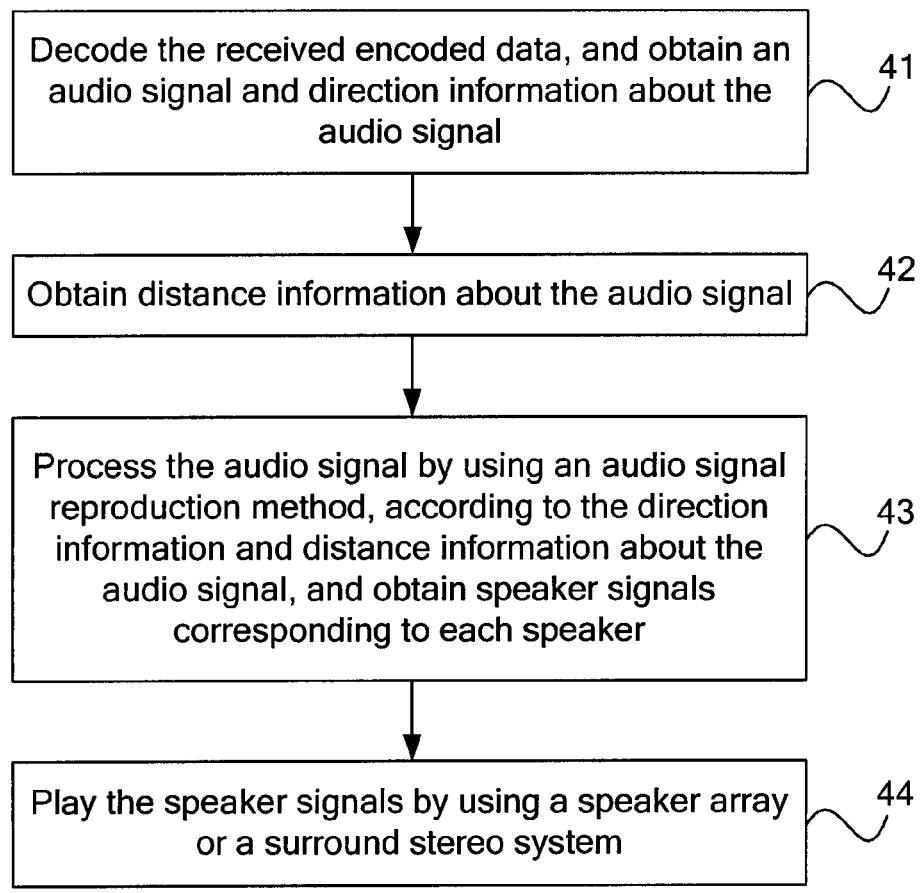
FIG. 14 is a flowchart of a method for playing audio signals according to a first embodiment of the present invention.

FIG. 14 is a flowchart of a method for playing audio signals according to a first embodiment of the present invention. The method includes the following steps:

41. Decode the received encoded data, and obtain an audio signal and direction information about the audio signal.

42. Obtain the distance information about the audio signal.

43. Process the audio signal by using an audio signal reproduction method, according to the direction information and distance information about the audio signal, and obtain speaker signals corresponding to each speaker.

44. Play the speaker signals by using a speaker array or a surround stereo system.

In this embodiment, the received encoded data is decoded, and the audio signal, the direction information about the audio signal, and the distance information about the audio signal are obtained; the audio signal is processed according to the direction information and distance information about the audio signal, and a speaker signal is obtained; the speaker signal is played. In this way, the position information, including direction information and distance information, about the audio signal may be obtained accurately in combination with the three-dimensional video signal and three-dimensional audio signal, without increasing the size of the microphone array, and the audio signal is played.

Embodiment 2 of the Method for Playing Audio Signals

Figure 15:
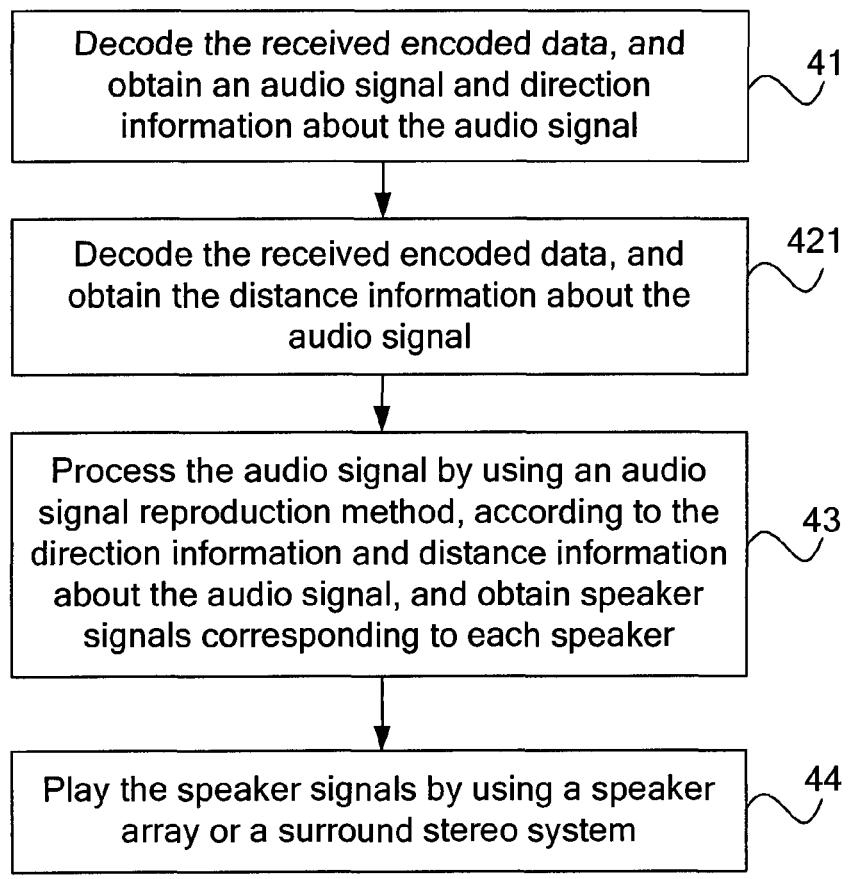
FIG. 15 is a flowchart of a method for playing audio signals according to a second embodiment of the present invention.

FIG. 15 is a flowchart of a method for playing audio signals according to a second embodiment of the present invention. On the basis of the technical solution shown in FIG. 14, optionally, step 42 may further include the following sub-steps:

421. Decode the received encoded data, and obtain the distance information about the audio signal.

In this embodiment, the received encoded data is decoded, and the audio signal, the direction information about the audio signal, and the distance information about the audio signal are obtained; the audio signal is processed according to the direction information and distance information about the audio signal, and a speaker signal is obtained; the speaker information is played. In this way, the position information, including direction information and distance information, about the audio signal may be obtained accurately, without increasing the size of the microphone array, and the audio signal is played.

Embodiment 3 of the Method for Playing Audio Signals

Figure 16:
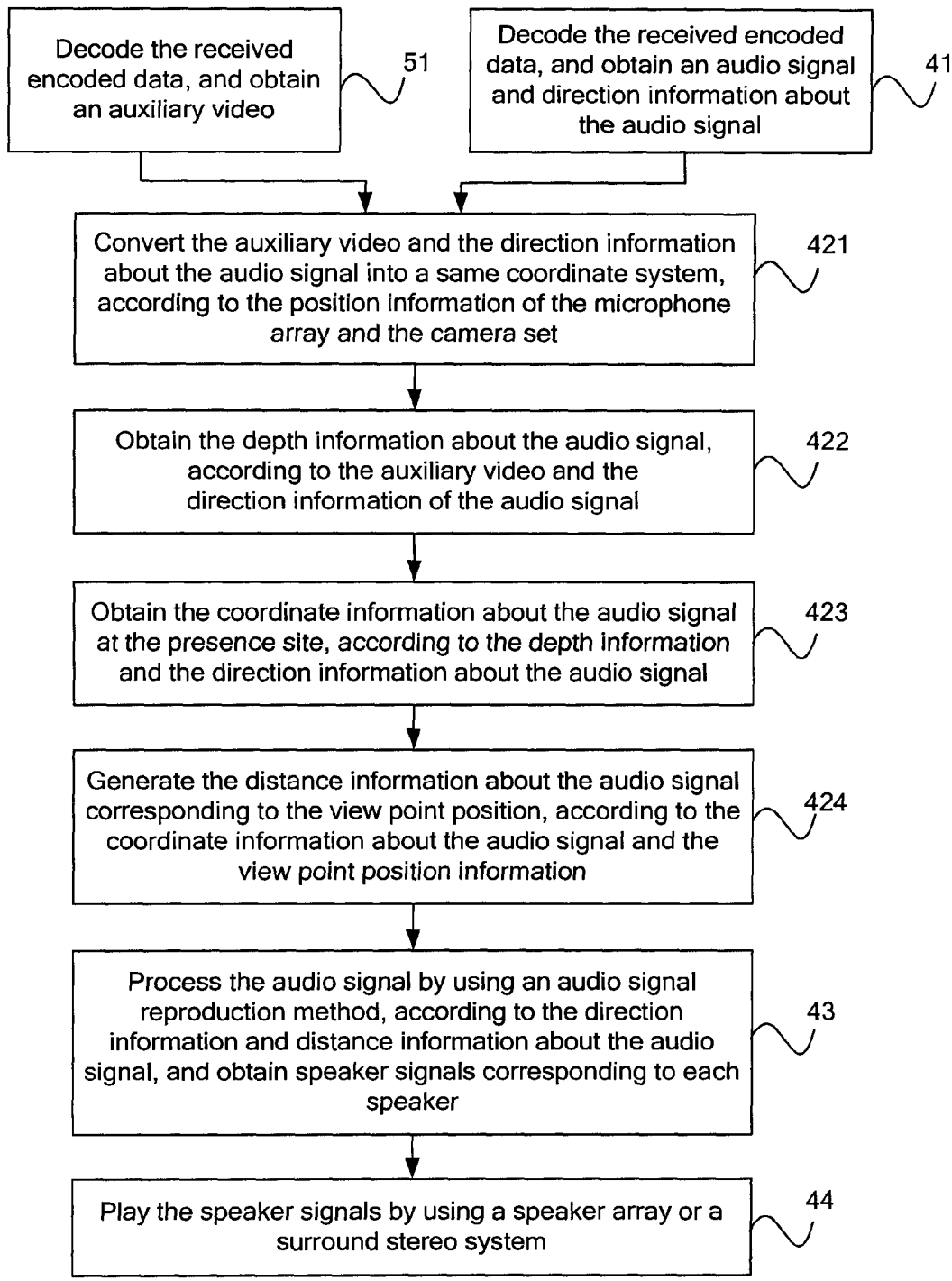
FIG. 16 is a flowchart of a method for playing audio signals according to a third embodiment of the present invention.

FIG. 16 is a flowchart of a method for playing audio signals according to a third embodiment of the present invention. On the basis of the technical solution shown in FIG. 14, optionally, the method may further include the following steps:

51. Decode the received encoded data, and obtain an auxiliary video.

Optionally, on the basis of the technical solution shown in FIG. 14, step 42 may include the following sub-steps:

422. Obtain the depth information about the audio signal, according to the auxiliary video and the direction information about the audio signal.

423. Obtain the coordinate information about the audio signal at the presence site, according to the depth information and the direction information about the audio signal.

424. Generate the distance information about the audio signal corresponding to the view point position, according to the coordinate information about the audio signal and the view point position information.

Optionally, the method may further include the following steps before step 422:

421. Convert the auxiliary video and the direction information about the audio signal into the same coordinate system according to the position information about the microphone array and the camera set.

In this embodiment, the received encoded data is decoded, and the audio signal, direction information about the audio signal, and the auxiliary video are obtained; the distance information about the audio signal is obtained, according to the auxiliary video and the direction information about the audio signal; the audio signal is processed according to the direction information and distance information about the audio signal, and a speaker signal is obtained; the speaker information is played. In this way, the position information, including direction information and distance information, about the audio signal may be obtained accurately in combination with the three-dimensional video signal and three-dimensional audio signal, without increasing the size of the microphone array, and the audio signal is played.

Further, the coordinate system used when the microphone array measures the direction of a sound source during actual system layout may not match the coordinate system of the camera system. Thus, the two coordinate systems need to be converted to ensure that the calculations are performed under the same coordinate system.

Embodiment 4 of the Method for Playing Audio Signals

Figure 17:
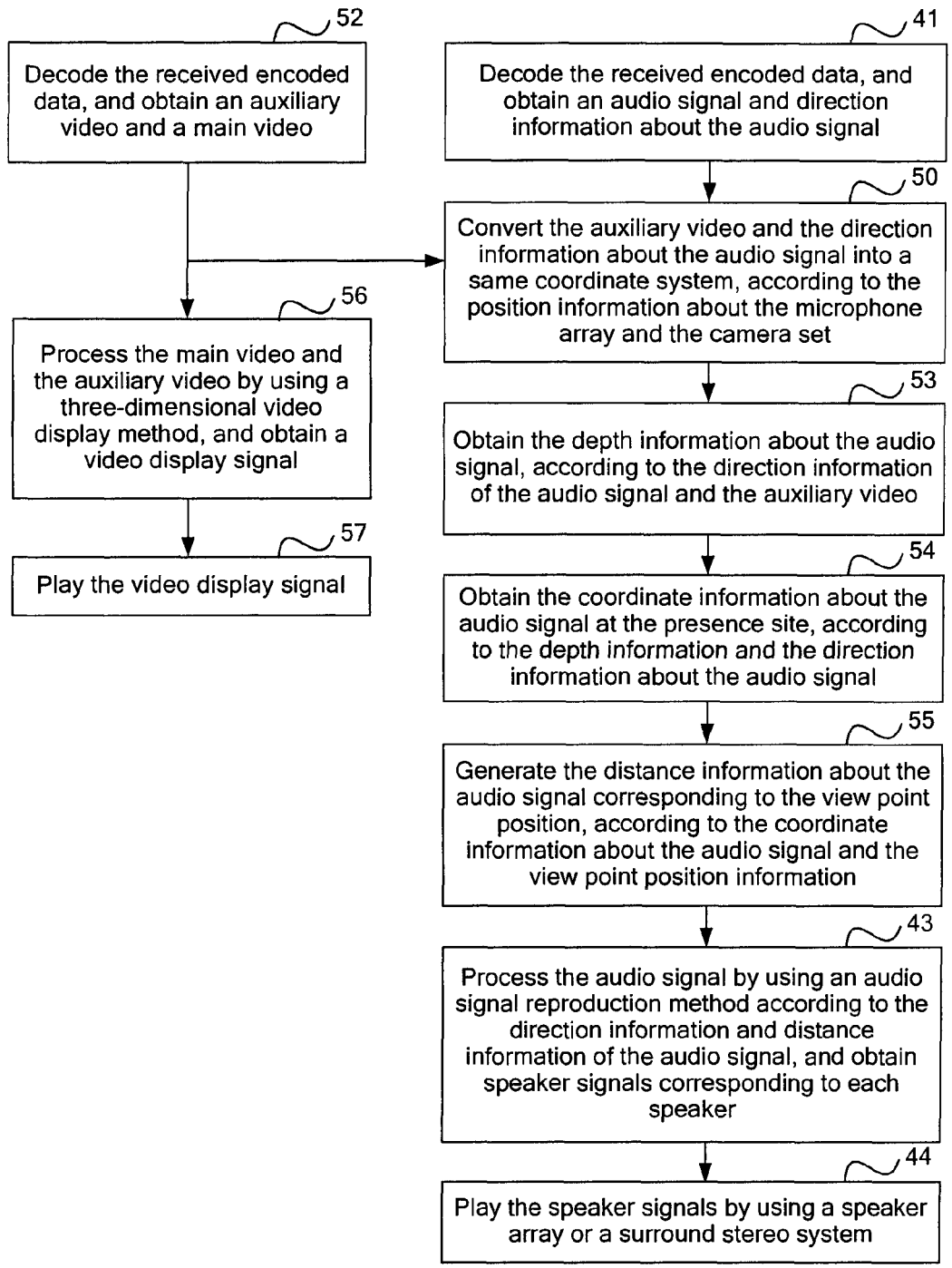
FIG. 17 is a flowchart of a method for playing audio signals according to a fourth embodiment of the present invention.

FIG. 17 is a flowchart of a method for playing audio signals according to a fourth embodiment of the present invention. On the basis of the technical solution shown in FIG. 14, optionally, the method may further include the following steps:

52. Decode the received encoded data, and obtain an auxiliary video and a main video.

Optionally, on the basis of the technical solution shown in FIG. 14, step 42 may include the following sub-steps:

53. Obtain the depth information about the audio signal, according to the auxiliary video and the direction information about the audio signal.

54. Obtain the coordinate information about the audio signal at the presence site, according to the depth information and the direction information about the audio signal.

55. Generate the distance information about the audio signal corresponding to the view point position, according to the coordinate information about the audio signal and the view point position information.

Optionally, the method may further include the following steps before step 53:

50. Convert the auxiliary video and the direction information about the audio signal into the same coordinate system, according to the position information about the microphone array and the camera set.

Optionally, on the basis of the technical solution shown in FIG. 14, the method may include the following steps:

56. Process the main video and the auxiliary video by using a three-dimensional video display method, and obtain a video display signal.

57. Play the video display signal. In this embodiment, the received encoded data is decoded, and the audio signal, direction information about the audio signal, the auxiliary video, and main video are obtained; the distance information about the audio signal is obtained, according to the auxiliary video and the direction information about the audio signal; the audio signal is processed according to the direction information and distance information about the audio signal, and a speaker signal is obtained; the speaker information is played. In this way, the position information, including direction information and distance information, about the audio signal may be obtained accurately in combination with the three-dimensional video signal and three-dimensional audio signal, without increasing the size of the microphone array, and the audio signal is played.

Further, in this embodiment, the main video and the auxiliary video are processed, and a video display signal is obtained; the video display signal is played. In this way, the video signal is played, and the video signal and audio signal are combined.

Embodiment 1 of the Apparatus for Playing Audio Signals

Figure 18:
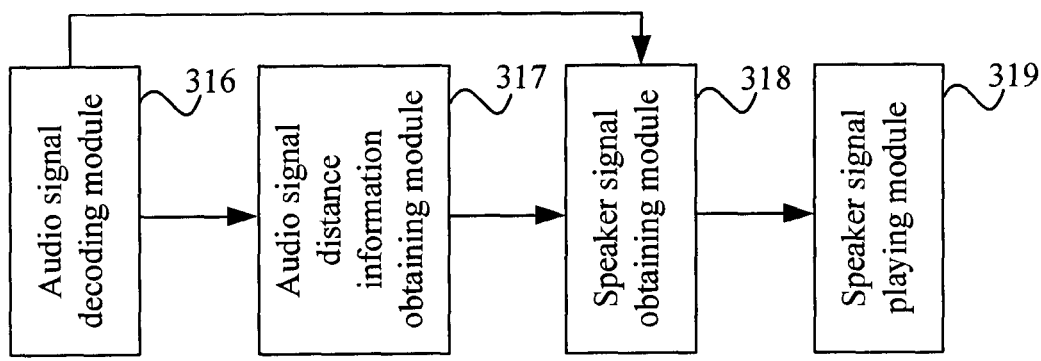
FIG. 18 illustrates a structure of an apparatus for playing audio signals according to a first embodiment of the present invention.

FIG. 18 shows a structure of an apparatus for playing audio signals according to a first embodiment of the present invention. The apparatus may include an audio signal decoding module 316, an audio signal distance information obtaining module 317, a speaker signal obtaining module 318, and a speaker signal playing module 319. The audio signal distance information obtaining module 317 is connected with the audio signal decoding module 316. The speaker signal obtaining module 318 is connected with the audio signal decoding module 316 and the audio signal distance information obtaining module 317. The speaker signal playing module 319 is connected with the speaker signal obtaining module 318. The audio signal decoding module 316 is configured to decode the received encoded data, and obtain the audio signal and direction information about the audio signal. The audio signal distance information obtaining module 317 is configured to obtain the distance information about the audio signal. The speaker signal obtaining module 318 is configured to: receive, from the audio signal decoding module 316, the audio signal and the direction information about the audio signal, receive, from the audio signal distance information obtaining module 317, the distance information about the audio signal, process the audio signal by using an audio signal reproduction method, according to the direction information and distance information about the audio signal, and obtain speaker signals corresponding to each speaker. The speaker signal playing module 319 is configured to play the speaker signals by using a speaker array or a surround stereo system.

If the speaker signal playing module 319 (for example, the speaker array) provides functions of the speaker signal obtaining module 318, the speaker signal obtaining module 318 becomes unnecessary.

In this embodiment, the audio signal decoding module 316 decodes the received encoded data, and obtains the audio signal and direction information about the audio signal; the audio signal distance information obtaining module 317 obtains the distance information about the audio signal. The speaker signal obtaining module 318 processes the audio signal, according to the direction information and distance information about the audio signal, and obtains a speaker signal; the speaker signal playing module 319 plays the speaker signal. In this way, the position information, including the direction information and distance information, about the audio signal may be obtained accurately in combination with the three-dimensional video signal and three-dimensional audio signal, without increasing the size of the microphone array, and the audio signal is played.

Embodiment 2 of the Apparatus for Playing Audio Signals

Figure 19:
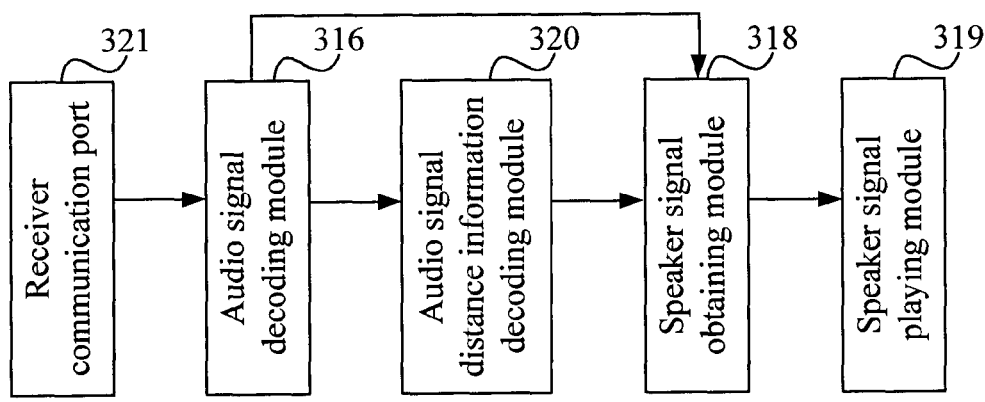
FIG. 19 illustrates a structure of an apparatus for playing audio signals according to a second embodiment of the present invention.

FIG. 19 shows a structure of an apparatus for playing audio signals according to a second embodiment of the present invention. On the basis of the structure shown in FIG. 18, the audio signal distance information obtaining module 317 may be an audio signal distance information decoding module 320 configured to decode the received encoded data and obtain the distance information about the audio signal.

In this embodiment, the apparatus may further include a receiver communication interface 321 configured to receive encoded data sent through the network and send the encoded data to the audio signal decoding module 316.

In this embodiment, the audio signal decoding module 316 decodes the received encoded data, and obtains the audio signal and direction information about the audio signal; the audio signal distance information decoding module 320 decodes the received encoded data, and obtains the distance information about the audio signal. The speaker signal obtaining module 318 processes the audio signal, according to the direction information and distance information about the audio signal, and obtains a speaker signal; the speaker signal playing module 319 plays the speaker signal. In this way, the received encoded data is decoded, and the position information, including the direction information and distance information, about the audio signal may be obtained accurately, without increasing the size of the microphone array, and the audio signal is played.

Embodiment 3 of the Apparatus for Playing Audio Signals

Figure 20:
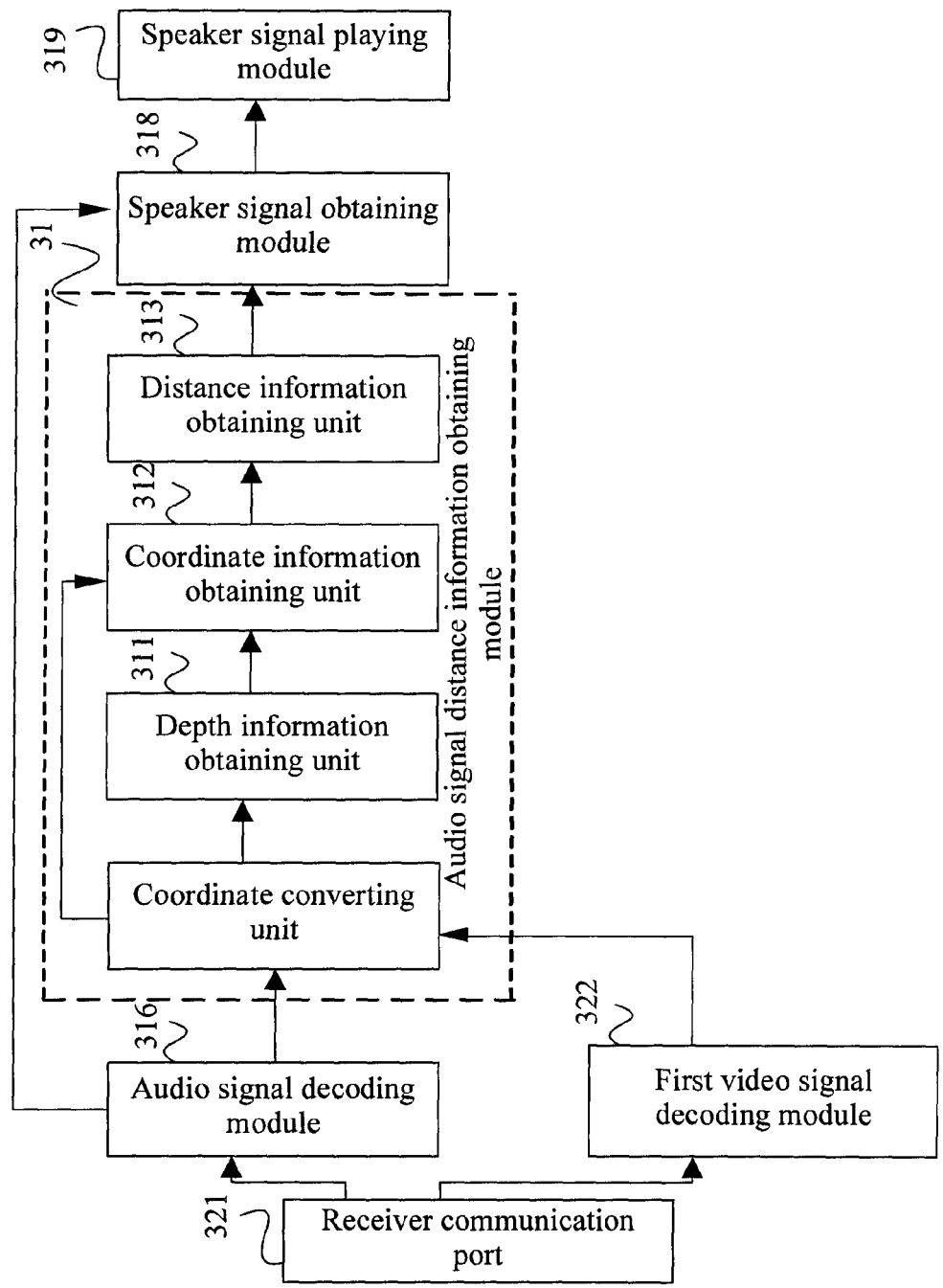
FIG. 20 illustrates a structure of an apparatus for playing audio signals according to a third embodiment of the present invention.

FIG. 20 shows a structure of an apparatus for playing audio signals according to a third embodiment of the present invention. On the basis of the structure shown in FIG. 18, the apparatus may further include a first video signal decoding module 322 configured to decode the received encoded data and obtain an auxiliary video.

On the basis of the structure shown in FIG. 18, the audio signal distance information obtaining module 317 may specifically be an audio signal distance information obtaining module 31 connected with the audio decoding module 316 and the first video signal decoding module 322 and configured to generate the distance information about the audio signal, according to the auxiliary video and the direction information about the audio signal.

The audio signal distance information obtaining module 31 may include a depth information obtaining unit 311, a coordinate information obtaining unit 312, and a distance information obtaining unit 313. The coordinate information obtaining unit 312 is connected with the depth information obtaining unit 311. The distance information obtaining unit 313 is connected with the coordinate information obtaining unit 312. The depth information obtaining unit 311 is configured to obtain the depth information about the audio signal, according to the auxiliary video and the direction information about the audio signal. The coordinate information obtaining unit 312 is configured to obtain the coordinate information about the audio signal at the presence site, according to the depth information and the direction information about the audio signal. The distance information obtaining unit 313 is configured to generate distance information about the audio signal corresponding to the view point position, according to the coordinate information about the audio signal and the view point position information.

The audio signal distance information obtaining module 31 may further include: a coordinate converting unit 314, connected with the first video signal decoding module 322 and the audio signal decoding module 316 and configured to: convert the auxiliary video and the direction information about the audio signal into the same coordinate system, according to the position information about the microphone array and the camera set, send the auxiliary video and the direction information about the audio signal whose coordinates are converted, to the depth information obtaining unit 311, and send the direction information about the audio signal whose coordinates are converted, to the coordinate information obtaining unit 312.

On the basis of the structure shown in FIG. 18, the apparatus may further include a receiver communication interface 321 configured to receive the encoded data sent through the network and send the encoded data to the audio signal decoding module 316 and the first video signal decoding module 322.

In this embodiment, the audio signal decoding module 316 decodes the received encoded data, and obtains the audio signal and direction information about the audio signal; the audio signal distance information obtaining module 31 generates the distance information about the audio signal, according to the auxiliary video and the direction information about the audio signal. The speaker signal obtaining module

318 processes the audio signal, according to the direction information and distance information about the audio signal, and obtains a speaker signal; the speaker signal playing module 319 plays the speaker signal. In this way, the position information, including the direction information and distance information, about the audio signal may be obtained accurately in combination with the three-dimensional video signal and three-dimensional audio signal, without increasing the size of the microphone array, and the audio signal is played.

Embodiment 4 of the Apparatus for Playing Audio Signals

Figure 21:
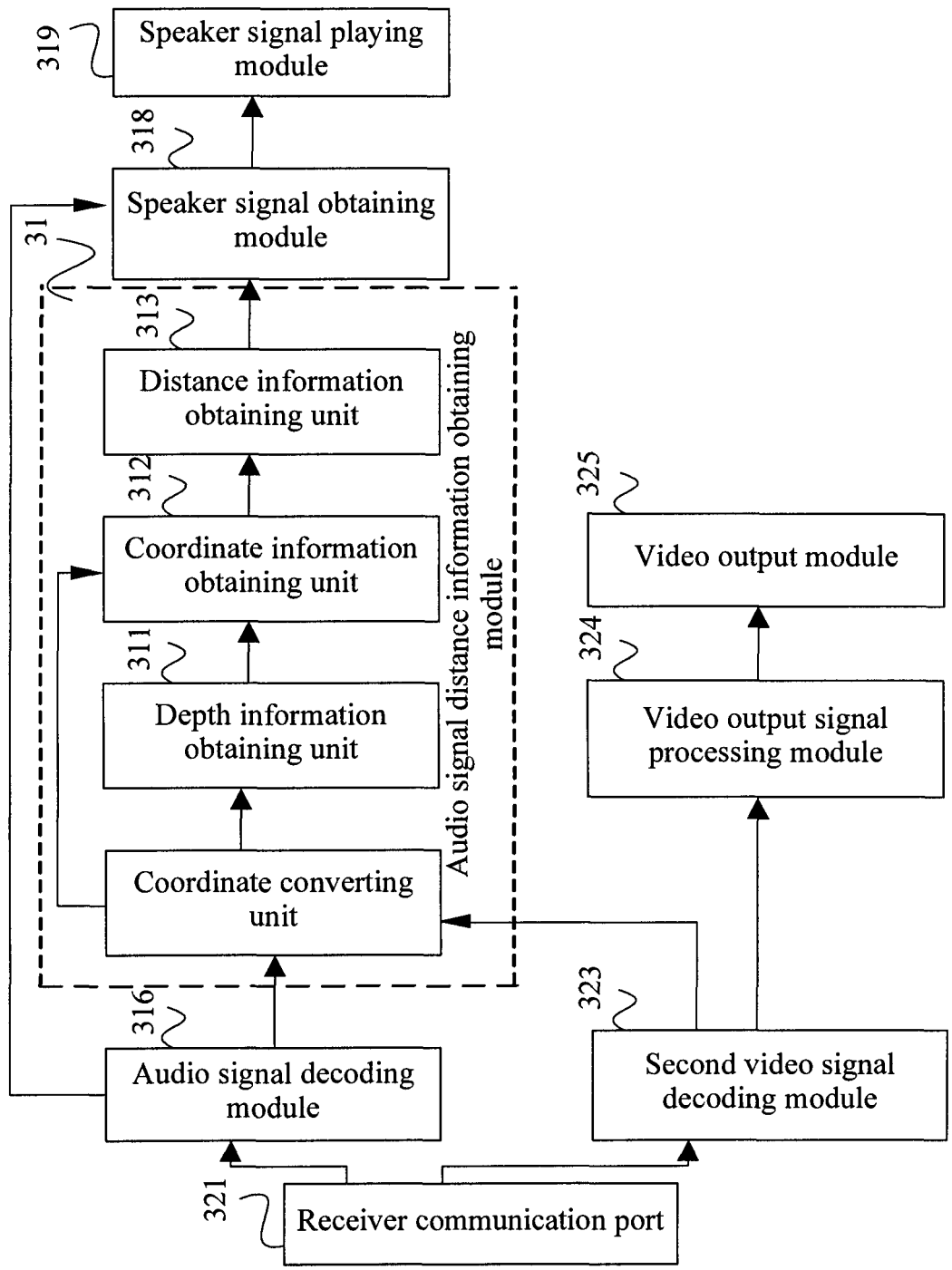
FIG. 21 illustrates a structure of an apparatus for playing audio signals according to a fourth embodiment of the present invention.

FIG. 21 shows a structure of an apparatus for playing audio signals according to a fourth embodiment of the present invention. On the basis of the structure shown in FIG. 18, the apparatus may further include a second video signal decoding module 323, a video output signal processing module 324, and a video output module 325. The video output signal processing module 324 is connected with the second video signal decoding module 323, and the video output module 325 is connected with the video output signal processing module 324. The second video signal decoding module 323 is configured to decode the received encoded data, and obtain an auxiliary video and a main video. The video output signal processing module 324 is configured to process the main video and the auxiliary video by using a three-dimensional video display method, and obtain a video display signal. The video output module 325 is configured to play the video display signal.

On the basis of the structure shown in FIG. 18, the audio signal distance information obtaining module 317 may specifically be an audio signal distance information obtaining module 31 connected with the audio decoding module 316 and the second video signal decoding module 323 and configured to generate the distance information about the audio signal, according to the auxiliary video and the direction information about the audio signal.

Specifically, the audio signal distance information obtaining module 31 may include a depth information obtaining unit 311, a coordinate information obtaining unit 312, and a distance information obtaining unit 313. The coordinate information obtaining unit 312 is connected with the depth information obtaining unit 311. The distance information obtaining unit 313 is connected with the coordinate information obtaining unit 312. The depth information obtaining unit 311 is configured to obtain the depth information about the audio signal, according to the auxiliary video and the direction information about the audio signal. The coordinate information obtaining unit 312 is configured to obtain the coordinate information about the audio signal at the presence site, according to the depth information and the direction information about the audio signal. The distance information obtaining unit 313 is configured to generate distance information about the audio signal corresponding to the view point position, according to the coordinate information about the audio signal and the view point position information.

The audio signal distance information obtaining module 31 may further include: a coordinate converting unit 314, connected with the video input signal processing module 36 and the audio input signal processing module 34 and configured to: convert the auxiliary video and the direction information about the audio signal into the same coordinate system, according to the position information about the microphone array and the camera set, send the auxiliary video and the direction information about the audio signal whose coordinates are converted, to the depth information obtaining unit 311, and send the direction information about the audio signal whose coordinates are converted, to the coordinate information obtaining unit 312.

On the basis of the structure shown in FIG. 18, the apparatus may further include a receiver communication interface 321 configured to receive the encoded data sent through the network and send the encoded data to the audio signal decoding module 316 and the second video signal decoding module 323.

The video output module 325 is generally a stereoscopic display. If the stereoscopic display provides functions of the video output signal processing module 324, the video output signal processing module 324 becomes unnecessary.

In this embodiment, the audio signal decoding module 316 decodes the received encoded data, and obtains the audio signal and direction information about the audio signal; the audio signal distance information obtaining module 31 generates the distance information about the audio signal, according to the auxiliary video and the direction information about the audio signal. The speaker signal obtaining module 318 processes the audio signal, according to the direction information and distance information about the audio signal, and obtains a speaker signal; the speaker signal playing module 319 plays the speaker signal. In this way, the position information, including the direction information and distance information, about the audio signal may be obtained accurately in combination with the three-dimensional video signal and three-dimensional audio signal, without increasing the size of the microphone array, and the audio signal is played.

Further, the video output signal processing module 324 processes the main video and the auxiliary video by using a three-dimensional video display method, and obtains a video display signal; the video output module 325 plays the video display signal. In this way, the video signal is played, and the video signal and audio signal are combined.

Embodiment of the System for Processing Audio Signals

Figure 22:
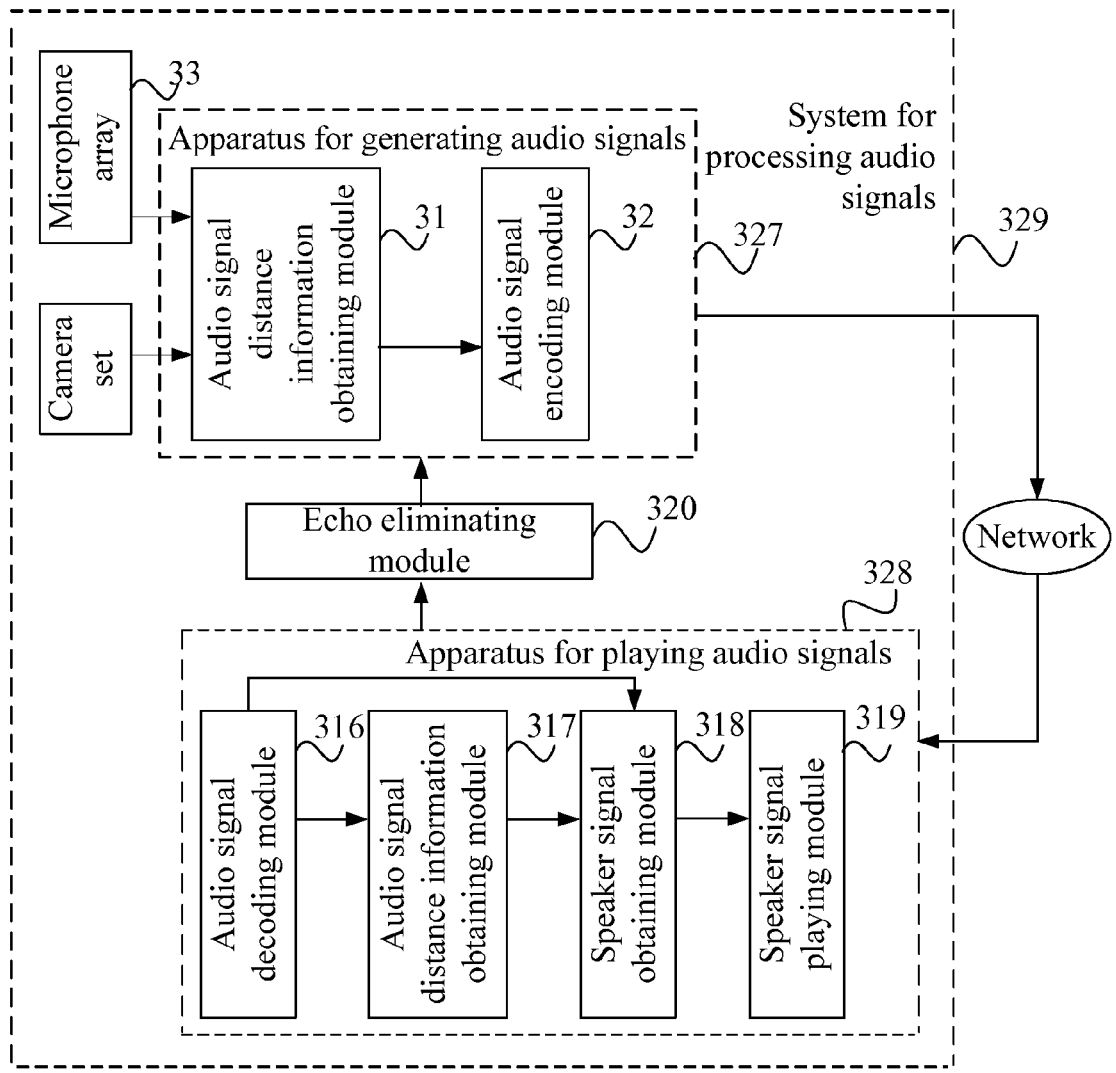
FIG. 22 illustrates a structure of a system for processing audio signals according to an embodiment of the present invention.

FIG. 22 shows a structure of a system for processing audio signals according to an embodiment of the present invention. The system 329 for processing audio signals may include an apparatus 327 for generating audio signals and an apparatus 328 for playing audio signals.

The apparatus 327 for generating audio signals may include an audio signal distance information obtaining module 31 and an audio signal encoding module 32. The audio signal encoding module 32 is connected with the audio signal distance information obtaining module 31. The audio signal distance information obtaining module 317 is configured to generate the distance information about the audio signal corresponding to the view point position, according to the obtained auxiliary video and the direction information about the audio signal, where the auxiliary video is a disparity map or a depth map. The audio signal encoding module 32 is configured to encode the audio signal, the direction information about the audio signal, and the distance information about the audio signal, and send the encoded information.

The apparatus 328 for playing audio signals may include an audio signal decoding module 316, an audio signal distance information obtaining module 317, a speaker signal obtaining module 318, and a speaker signal playing module 319. The audio signal distance information obtaining module 317 is connected with the audio signal decoding module 316. The speaker signal obtaining module 318 is connected with the audio signal decoding module 316 and the audio signal distance information obtaining module 317. The speaker signal playing module 319 is connected with the speaker signal obtaining module 318. The audio signal decoding module 316 is configured to decode the received encoded data, and obtain the audio signal and the direction information about the audio signal. The audio signal distance information obtaining module 317 is configured to obtain the distance information about the audio signal. The speaker signal obtaining module 318 is configured to process the audio signal by using an audio signal reproduction method, according to the direction information and distance information about the audio signal, and obtain speaker signals corresponding to each speaker. The speaker signal playing module 319 is configured to play the speaker signal by using a speaker array or a surround stereo system.

In this embodiment, the system may further include an echo eliminating module 320 connected with the apparatus 327 for generating audio signals and the apparatus 328 for playing audio signals and configured to eliminate echoes.

In this embodiment, the position information, including direction information and distance information, about the audio signal may be obtained accurately in combination with the three-dimensional video signal and the three-dimensional audio signal, without increasing the size of the microphone array, and the audio signal is sent and played.

Those skilled in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a read only memory (ROM), a random access memory (RAM), a magnetic disk, or a compact disk-read only memory (CD-ROM).

Although the technical solution under the present invention has been described through some exemplary embodiments, the invention is not limited to such embodiments. It is apparent that those skilled in the art can make various modifications and variations to the invention without departing from the spirit and scope of the invention.

What is claimed is:

1. An audio signal encoding method for a first site of a multi-media conference to generate audio signals for audio playback at a second site of the multi-media conference, comprising:
   receiving an auxiliary video by a camera set at the first site and an audio signal by a microphone array at the first site, wherein the received auxiliary video includes a disparity map or a depth map;
   deriving, from the received audio signal, direction information about a signal sound source point at the first site;
   converting the received auxiliary video and the derived direction information about the signal sound source point at the first site into a common coordinate system in the received auxiliary video, according to position information of the microphone array and the camera set;
   calculating, according to the received auxiliary video and the derived direction information, coordinates of a video point corresponding to the signal sound source point in said common coordinate system at the first site;
   generating, from the depth map or the disparity map included in the received auxiliary video at the first site, a depth information of a playback sound source point at the second site corresponding to the signal sound source point at the first site according to the calculated coordinates of the video point;
   calculating a horizontal coordinate and a vertical coordinate of the playback sound source point in a coordinate system at the second site having a display screen for the audio playback according to the generated depth information and wherein one of said horizontal coordinate and said vertical coordinate of the playback sound source point in said coordinate system is derived from the generated depth information;
   generating a distance information between the playback sound source point and a video view point having a position in said coordinate system at the second site for the audio playback, according to the horizontal coordinate, the vertical coordinate, the depth information and the position of the video view point, wherein the distance information between the playback sound source point and the video view point is to be used for the audio playback at the second site;
   encoding the received audio signal, the derived direction information about the signal sound source point at the first site, and the generated distance information between the playback sound source point and the video view point at the second site into an encoded information; and
   sending the encoded information to the second site for the audio playback.

2. The audio signal encoding method of claim 1, wherein the audio signal encoding method further comprises:
   capturing, by the microphone array, at least two audio signals as an input audio stream;
   processing the input audio stream by using a microphone array processing method, and obtaining an enhanced audio signal and the direction information about the signal sound source point;
   capturing, by the camera set, at least two video signals as an input video stream; and
   obtaining a main video and the auxiliary video according to the input video stream.

3. The audio signal encoding method of claim 2, wherein the step of the capturing at least two audio signals as the input audio stream by the microphone array comprises:
   capturing, by the microphone array, at least two audio signals as a first input audio stream, wherein each audio signal of the at least two audio signals is a mixed audio signal composed of sound signals from multiple sound sources; and
   separating the each audio signal from the first input audio stream by using an audio signal separation method, obtaining audio signals corresponding to sounds of each sound source of the multiple sound sources, and combining the obtained audio signals into an input audio stream.

4. The audio signal encoding method of claim 1, wherein the step of the generating the depth information of the playback sound source point comprises:
   if the auxiliary video is a depth map, obtaining the depth information about the audio signal directly from the depth map, according to the coordinates of the video point; and
   if the auxiliary video is the disparity map, obtaining a disparity of the audio signal from the disparity map, according to the coordinates of the video point, and obtaining the depth information of the playback sound source point through a calculation according to the disparity.

5. An audio signal encoding apparatus located at a first site of a multi-media conference for generating audio signals used for audio playback at a second site of the multi-media conference, comprising:
- a receiving module configured to receive an auxiliary video by a camera set located at the first site and an audio signal by a microphone array located at the first site, wherein the auxiliary video is a disparity map or a depth map;
- a direction information deriving module, coupled to the receiving module, configured to derive, from the received audio signal, a direction information about a signal sound source point at the first site,
- a coordinate converting module, coupled to the receiving module and the direction information deriving module, to convert the received auxiliary video and the derived direction information about the signal sound source point at the first site into a common coordinate system in the received auxiliary video, according to position information of the microphone array and the camera set;
- a coordinate calculating module, coupled to the receiving module, the direction information deriving module, and the coordinate conversion module, configured to calculate, according to the received auxiliary video and the derived direction information, coordinates of a video point corresponding to the signal sound source point in said common coordinate system at the first site;
- a depth information generating module, coupled to the coordinate calculating module, configured to generate a depth information of a playback sound source point at the second site corresponding to the signal sound source point at the first site according to the calculated coordinates of the video point from the depth map or the disparity map included in the received auxiliary video at the first site;
- a horizontal and vertical coordinates calculating module, coupled to the depth information generating module, configured to calculate a horizontal coordinate and a vertical coordinate of the playback sound source point in a coordinate system at the second site having a display screen for the audio playback according to the generated depth information and wherein one of said horizontal coordinate and said vertical coordinate of the playback sound source point in said coordinate system is derived from the generated depth information;
- an audio signal distance information generating module, coupled to the depth information generating module and the horizontal and vertical coordinates calculating module, configured to generate a distance information between the playback sound source point and a video view point having a position in said coordinate system at the second site for the audio playback, according to the horizontal coordinate, the vertical coordinate, the depth information, and the position of the video view point, wherein the distance information between the playback sound source point and the video view point is used for the audio playback at the second site; and
- an audio signal encoding module, coupled to the receiving module, the direction information deriving module, and the audio signal distance information generating module, configured to encode the received audio signal, the derived direction information about the signal sound source point at the first site, and the generated distance information between the playback sound source point and the video view point at the second site into an encoded information, and send the encoded information to the second site for the audio playback.

6. The audio signal encoding apparatus of claim 5, further comprising:
- the microphone array, configured to capture at least two audio signals as an input audio stream;
- an audio input signal processing module coupled to the microphone array to receive the input audio stream, configured to: process the input audio stream by using a microphone array processing method, obtain an enhanced audio signal, and send the enhanced audio signal to the audio signal encoding module;
- the camera set, configured to capture at least two video signals as an input video stream; and
- a video input signal processing module coupled to the camera set to receive the input video stream, configured to obtain a main video and the auxiliary video according to the input video stream.

7. The audio signal encoding apparatus of claim 6, wherein the microphone array comprises:
- a microphone array unit, configured to capture at least two audio signals as a first input audio stream, wherein each audio signal of the at leat two audio signals is a mixed audio signal composed of sounds signals from multiple sound sources; and
- an audio signal separating unit, configured to: separate the each audio signal from the first input audio stream by using an audio signal separation method, obtain audio signals corresponding to sounds of each sound source of the multiple sound sources, and combine the obtained audio signals into an input audio stream.

* * * * *

UNITED STATES PATENT AND TRADEMARK OFFICE
CERTIFICATE OF CORRECTION

PATENT NO.        : 8,705,778 B2                         Page 1 of 1
APPLICATION NO.   : 13/035400
DATED             : April 22, 2014
INVENTOR(S)       : Wuzhou Zhan and Dongqi Wang It is certified that error appears in the above-identified patent and that said Letters Patent is hereby corrected as shown below:

On the title page, item (73) Assignee: delete "Huawei Technologies Co., Ltd. (CN)" and insert --Huawei Device Co., Ltd. (CN)--.

Signed and Sealed this
Fourteenth Day of October, 2014

Michelle K. Lee
*Deputy Director of the United States Patent and Trademark Office*